United States Patent
Paek et al.

(10) Patent No.: US 12,203,034 B2
(45) Date of Patent: Jan. 21, 2025

(54) SELECTIVE SEPARATION OF NAPHTHENES FOR PRODUCTION OF ENHANCED VISCOSITY INDEX LUBE BASE STOCKS

(71) Applicant: ExxonMobil Technology and Engineering Company, Annandale, NJ (US)

(72) Inventors: Changyub Paek, Bridgewater, NJ (US); Joseph M. Falkowski, Hampton, NJ (US); Yogesh V. Joshi, Bridgewater, NJ (US); Carmen C. Lasso, Newark, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 0 days.

(21) Appl. No.: 17/664,177

(22) Filed: May 19, 2022

(65) Prior Publication Data

US 2023/0287278 A1    Sep. 14, 2023

Related U.S. Application Data

(60) Provisional application No. 63/269,135, filed on Mar. 10, 2022.

(51) Int. Cl.
   *C10G 25/00* (2006.01)
   *B01J 20/22* (2006.01)

(52) U.S. Cl.
   CPC .......... *C10G 25/003* (2013.01); *B01J 20/226* (2013.01); *C10G 2300/1062* (2013.01); *C10G 2400/10* (2013.01)

(58) Field of Classification Search
   None
   See application file for complete search history.

(56) References Cited

U.S. PATENT DOCUMENTS

| | | |
|---|---|---|
| 4,827,064 A | 5/1989 | Wu |
| 4,827,073 A | 5/1989 | Wu |

(Continued)

FOREIGN PATENT DOCUMENTS

| | | |
|---|---|---|
| GB | 1250074 A | 10/1971 |
| WO | 2021/076200 A1 | 4/2021 |

OTHER PUBLICATIONS

Lo et al. "A mesoporous aluminium metal-organic framework with 3 nm open pores" Journal of Materials Chemistry A, 2013, 1, 324-329. (Year: 2013).*

(Continued)

*Primary Examiner* — In Suk C Bullock
*Assistant Examiner* — Alyssa L Cepluch
(74) *Attorney, Agent, or Firm* — C. Tumey Law Group PLLC

(57) ABSTRACT

This disclosure provides methods for separating multi-ring naphthenes from a hydrocarbon feedstock. The hydrocarbon feedstock includes at least normal paraffins, isoparaffins, 1-ring naphthenes attached with a paraffinic alkyl chain, and multi-ring naphthenes. The methods comprise passing the hydrocarbon feedstock and a solvent, at a temperature and pressure through a bed of an adsorbent comprising a metal-organic framework (MOF) adsorbent, to adsorb the multi-ring naphthenes from the hydrocarbon feedstock, thereby producing a base stock product that is depleted in multi-ring naphthenes. The metal-organic framework adsorbent is a (Continued)

porous crystalline material comprised of metal functionalities connected by organic linkers to form a repeating 2-D or 3-D lattice. The base stock product has a viscosity index (VI) greater than the viscosity index of the hydrocarbon feedstock. The methods of this disclosure upgrade Group II base stocks (also Group II+ base stocks) to Group III or Group III+ base stocks, and also upgrade Group III base stocks to Group III+ base stocks.

24 Claims, 8 Drawing Sheets

(56) References Cited

U.S. PATENT DOCUMENTS

| | | | |
|---|---|---|---|
| 4,956,122 A | | 9/1990 | Watts et al. |
| 2019/0390126 A1* | | 12/2019 | McCool ............ C10G 73/28 |
| 2019/0390129 A1* | | 12/2019 | McCool ............ C10G 53/04 |
| 2022/0389331 A1 | | 12/2022 | Partridge et al. |

OTHER PUBLICATIONS

Knovel "Basic Physical Properties of Chemical Compounds" Knovel Critical Tables (2nd Edition) Pentane, Hexane, Heptane values 2008. (Year: 2008).*

IARC "Occupational Exposures in Petroleum Refining; Crude Oil and Major Petroleum Fuels" Glossary. vol. 45, 1989 pp. 1-5 and 275-282 (Year: 1989).*

ECHA "Reach Factsheets" for straight-run naphtha and gasoline. Retrieved Jan. 12, 2024 (Year: 2024).*

Naeem, "Mixed-linker approach in designing porous zirconium-based metal-organic frameworks with hydrogen storage capacity", Chem. Comm., 2016, 52, 7826.

Gao, W-Y., et al., "Two highly porous single-crystalline zirconium-based metal-organic frameworks", Science China Chemistry, vol. 59, No. 08, accessed on Aug. 2016, pp. 980-983 (Jul. 14, 2016).

International Search Report and Written Opinion received for PCT Patent Application No. PCT/US2023/063777, mailed on Jun. 2, 2023, 12 pages.

* cited by examiner

Fig. 7

|  | Commercial Group III | Case 1 | Case 2 | Case 3 | Case 4 |
|---|---|---|---|---|---|
| Yield, wt% | Feed | 34% | 62% | 86% | 90% |
| VI | 125 | 135 | 132 | 130 | 129 |
| KV@ 40C, cSt | 19.6 | 16.9 | 17.5 | 18.0 | 18.2 |
| KV@100C, cSt | 4.3 | 4.0 | 4.0 | 4.1 | 4.1 |

*KV (Kinematic Viscosity, cSt ($mm^2/s$))

Fig. 8

|  | Commercial Group II+ | Case 1 | Case 2 |
|---|---|---|---|
| Yield | Feed | 57% | 81% |
| VI | 115 | 125 | 121 |
| KV@ 40C | 23.6 | 20.3 | 21.2 |
| KV@100C | 4.7 | 4.3 | 4.4 |

SELECTIVE SEPARATION OF NAPHTHENES FOR PRODUCTION OF ENHANCED VISCOSITY INDEX LUBE BASE STOCKS

CROSS-REFERENCE TO RELATED APPLICATION

This application claims the benefit of U.S. Provisional Patent Application 63/269,135 filed Mar. 10, 2022 entitled SELECTIVE SEPARATION OF NAPHTHENES FOR PRODUCTION OF ENHANCED VISCOSITY INDEX LUBE BASE STOCKS, and U.S. Provisional Patent Application 63/194,292 filed May 28, 2021 entitled ADSORPTIVE PROCESS FOR SEPARATION OF ISOPARAFFINIC LUBE BASE STOCK FROM LOWER QUALITY OILS, the entireties of which are incorporated by reference herein.

BACKGROUND

The present disclosure generally relates to lubricating oil base stocks, and more particularly relates to methods and systems for selectively separating multi-ring naphthenes from lower quality lubricating oil base stocks, to enhance viscosity index (VI) of the lubricating oil base stocks, and thereby provide higher quality lubricating oil base stocks in high yield.

FIELD

Demand for Group III and III+ lubricating oil base stocks is growing while use of Group I and Group II lube oils is in decline. Therefore, upgrading lower quality base stock to higher quality base stock is desirable.

Group II base stocks and Group III base stocks produced by hydrocracking and or hydroisomerization contain low concentrations of multi-ring naphthenes. Multi-ring naphthenes, even in low concentrations, negatively impact viscosity index (VI) of base stocks, and thus lower quality of the base stocks.

Group II base stock is defined by API as having a viscosity index ("VI") of 80 to 120 and greater than 90 percent saturates with less than 0.03 percent sulfur. Group II base stock typically contains low concentrations of single and multi-ring naphthenes. Group III base stock is defined by API as having a viscosity index greater than 120 and greater than 90 percent saturates with a sulfur content of less than 0.03 percent. Group III base stock also typically contains low concentrations of single and multi-ring naphthenes.

To meet the growing demand for Group III and III+ lubricating oil base stocks, there is a need for upgrading lower quality base stock to higher quality base stock. In particular, there is a need for methods and systems that can selectively separate low concentrations of multi-ring naphthenes from complex mixes of lubricating oil base stocks to enhance viscosity index (VI) of the lubricating oil base stocks, and thereby provide higher quality lubricating oil base stocks in high yield.

SUMMARY

This disclosure relates to adsorptive separation to produce high quality lube base stocks by selective removal of multi-ring naphthenic molecules from lower quality of lube base stocks. Multi-ring naphthenes negatively impact viscosity index (VI) of the base stock, thus lower its quality. The methods of this disclosure separate these multi-ring naphthenes from complex hydrocarbon mixtures by using metal-organic framework (MOF) adsorbent, thereby enhancing viscosity index of the product. Higher grade base stocks such as Group III contain relatively lower concentration of multi-ring naphthenes, thus selective removal of lower concentration of those multi-ring naphthenes allows production of high yield with higher quality of product. In accordance with this disclosure, Group II base stocks (also Group II+ base stocks) can be upgraded to Group III or Group III+ base stocks, and also Group III base stocks can be upgraded to Group III+ base stocks.

This disclosure relates in part to a method for separating multi-ring naphthenes from a hydrocarbon feedstock, in which the hydrocarbon feedstock comprises at least normal paraffins, isoparaffins, 1-ring naphthenes attached with a paraffinic alkyl chain, and multi-ring naphthenes. The method comprises passing the hydrocarbon feedstock and a solvent, at a temperature and pressure through a bed of an adsorbent comprising a metal-organic framework (MOF) adsorbent, to adsorb the multi-ring naphthenes from the hydrocarbon feedstock, thereby producing a base stock product that is depleted in multi-ring naphthenes. The metal-organic framework adsorbent is a porous crystalline material comprised of metal functionalities connected by organic linkers to form a repeating 2-D or 3-D lattice. The base stock product has a viscosity index (VI) greater than the viscosity index of the hydrocarbon feedstock.

This disclosure also relates in part to a method of upgrading a Group II base stock to a Group II+, Group III or Group III+ base stock, in which the Group II base stock comprises at least normal paraffins, isoparaffins, 1-ring naphthenes attached with a paraffinic alkyl chain, and multi-ring naphthenes. The method comprises passing the Group II base stock and a solvent, at a temperature and pressure through a bed of an adsorbent comprising a metal-organic framework (MOF) adsorbent, to adsorb the multi-ring naphthenes from the Group II base stock, thereby producing a Group II+, Group III or Group III+ base stock that is depleted in multi-ring naphthenes. The metal-organic framework adsorbent is a porous crystalline material comprised of metal functionalities connected by organic linkers to form a repeating 2-D or 3-D lattice.

This disclosure further relates to a method of upgrading a Group II+ base stock to a Group III or Group III+ base stock, in which the Group II+ base stock comprises at least normal paraffins, isoparaffins, 1-ring naphthenes attached with a paraffinic alkyl chain, and multi-ring naphthenes. The method comprises passing the Group II+ base stock and a solvent, at a temperature and pressure through a bed of an adsorbent comprising a metal-organic framework (MOF) adsorbent, to adsorb the multi-ring naphthenes from the Group II+ base stock, thereby producing the Group III or Group III+ base stock that is depleted in multi-ring naphthenes. The metal-organic framework adsorbent is a porous crystalline material comprised of metal functionalities connected by organic linkers to form a repeating 2-D or 3-D lattice.

This disclosure yet further relates in part to a method of upgrading a Group III base stock to a Group III+ base stock, in which the Group III base stock comprises at least normal paraffins, isoparaffins, 1-ring naphthenes attached with a paraffinic alkyl chain, and multi-ring naphthenes. The method comprises passing the Group III base stock and a solvent, at a temperature and pressure through a bed of an adsorbent comprising a metal-organic framework (MOF)

adsorbent, to adsorb the multi-ring naphthenes from the Group III base stock, thereby producing the Group III+ base stock that is depleted in multi-ring naphthenes. The metal-organic framework adsorbent is a porous crystalline material comprised of metal functionalities connected by organic linkers to form a repeating 2-D or 3-D lattice.

This disclosure still further relates in part to a system for making a high quality base stock. The system comprises: an adsorption bed comprising a metal-organic framework (MOF) adsorbent, in which the metal-organic framework adsorbent is a porous crystalline material comprised of metal functionalities connected by organic linkers to form a repeating 2-D or 3-D lattice; a source of at least one hydrocarbon feedstock fluidically connected to the metal-organic framework adsorbent, in which the hydrocarbon feedstock comprises at least normal paraffins, isoparaffins, 1-ring naphthenes attached with a paraffinic alkyl chain, and multi-ring naphthenes; a source of one or more solvents fluidically connected to the metal-organic framework adsorbent; and a solvent recovery system in fluidic communication with the metal-organic framework adsorbent. The metal-organic framework adsorbent is contacted with the hydrocarbon feedstock and the solvent, at a temperature and pressure, to adsorb the multi-ring naphthenes from the hydrocarbon feedstock, thereby producing a base stock product that is depleted in multi-ring naphthenes. The base stock product has a viscosity index (VI) greater than the viscosity index of the hydrocarbon feedstock.

The selective separation method of this disclosure can produce a concentrated stream of multi-ring naphthenic molecules that can have applications as naphthene rich feedstock. For example, desorption of the metal-organic framework (MOF) adsorbent can produce a concentrated multi-ring naphthene stream for use as a naphthenic rich feedstock.

It has been surprisingly found that, in accordance with this disclosure, multi-ring naphthenes can be separated from complex hydrocarbon mixtures by using a metal-organic framework (MOF) adsorbent, thereby enhancing viscosity index of the base stock product. Higher grade base stocks such as Group III contain relatively lower concentrations of multi-ring naphthenes, thus selective removal of the lower concentration of multi-ring naphthenes allows production of high yield with higher quality base stock product. Multi-ring naphthenes negatively impact viscosity index (VI) of the base stock, thus lower its quality.

These and other features and attributes of the disclosed methods and systems and their advantageous applications and/or uses will be apparent from the detailed description of which follows.

BRIEF DESCRIPTION OF THE DRAWINGS

FIG. 7 shows tabular data resulting from a comparison of separated products at various yields from a Group III feedstock, in accordance with the Examples.

FIG. 8 shows tabular data resulting from a comparison of separated products at different yields from a Group II+ feedstock for viscosity index enhancement, in accordance with the Examples.

DETAILED DESCRIPTION

Figure 1:
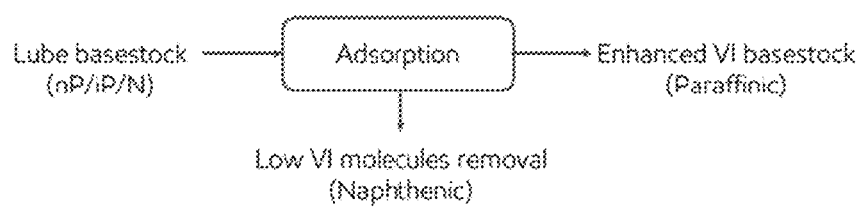
FIG. 1 depicts a flow diagram of an adsorptive separation process of this disclosure to produce lube base stock with enhanced viscosity index.

Lubricating base stocks, which can be used to formulate engine lubricants and industrial oils, are normally prepared from suitable petroleum feedstocks (hydrocarbon feedstock) by a variety of refining processes. These refining processes are generally directed to obtaining base stock with a predetermined set of properties, for example, viscosity, oxidation stability and maintenance of fluidity over a wide range of temperature. The composition of the base stock can include organic hydrocarbons such as normal paraffins (i.e., n-paraffins), branched paraffins (i.e., iso-paraffins) and cyclic paraffins (i.e., naphthenes). The presence of cyclic paraffinic compounds within the base stock can affect the properties and quality of the lubricating oil. For example, concentrations of multi-ring naphthenes, even low concentrations, can be undesirable, such as lowering viscosity index (VI) of the base stock.

Methods of making high quality lubricating oil base stock from lower quality lube oil (referred to herein as "base stock") by selective adsorption of multi-ring naphthenes are presented herein. The present methods provide quality lubricating oil/base stock from lower quality lube oil by selective separation of multi-ring naphthenes from the lower quality lube oil. Specifically, the present methods can upgrade Group II (also II+) to Group III or Group III+, and also upgrade Group III to Group III+.

This disclosure provides methods for separating multi-ring naphthenes from a hydrocarbon feedstock. The hydrocarbon feedstock comprises at least normal paraffins, isoparaffins, 1-ring naphthenes attached with a paraffinic alkyl chain, and multi-ring naphthenes. The method comprises passing the hydrocarbon feedstock and a solvent, at a temperature and pressure through a bed of an adsorbent comprising a metal-organic framework (MOF) adsorbent, to adsorb the multi-ring naphthenes from the hydrocarbon feedstock, thereby producing a base stock product that is depleted in multi-ring naphthenes. The metal-organic framework adsorbent is a porous crystalline material comprised of metal functionalities connected by organic linkers to form a repeating 2-D or 3-D lattice. The base stock product has a viscosity index (VI) greater than the viscosity index of the hydrocarbon feedstock.

In accordance with the various embodiments of the present methods, the method can include upgrading a Group II base stock to a Group II+, Group III or Group III+ base stock. The Group II base stock comprises at least normal paraffins, isoparaffins, 1-ring naphthenes attached with a paraffinic alkyl chain, and multi-ring naphthenes. The method comprises passing the Group II base stock and a solvent, at a temperature and pressure through a bed of an adsorbent comprising a metal-organic framework (MOF) adsorbent, to adsorb the multi-ring naphthenes from the Group II base stock, thereby producing a Group II+, Group III or Group III+ base stock that is depleted in multi-ring naphthenes. The metal-organic framework adsorbent is a porous crystalline material comprised of metal functionalities connected by organic linkers to form a repeating 2-D or 3-D lattice.

Also provided herein are methods of upgrading a Group II+ base stock to a Group III or Group III+ base stock, in which the Group II+ base stock comprises at least normal paraffins, isoparaffins, 1-ring naphthenes attached with a paraffinic alkyl chain, and multi-ring naphthenes. The method comprises passing the Group II+ base stock and a solvent, at a temperature and pressure through a bed of an adsorbent comprising a metal-organic framework (MOF) adsorbent, to adsorb the multi-ring naphthenes from the Group II+ base stock, thereby producing the Group III or Group III+ base stock that is depleted in multi-ring naphthenes. The metal-organic framework adsorbent is a porous crystalline material comprised of metal functionalities connected by organic linkers to form a repeating 2-D or 3-D lattice.

Further provided herein are methods of upgrading a Group III base stock to a Group III+ base stock. The Group III base stock comprises at least normal paraffins, isoparaffins, 1-ring naphthenes attached with a paraffinic alkyl chain, and multi-ring naphthenes. The method comprises passing the Group III base stock and a solvent, at a temperature and pressure through a bed of an adsorbent comprising a metal-organic framework (MOF) adsorbent, to adsorb the multi-ring naphthenes from the Group III base stock, thereby producing the Group III+ base stock that is depleted in multi-ring naphthenes. The metal-organic framework adsorbent is a porous crystalline material comprised of metal functionalities connected by organic linkers to form a repeating 2-D or 3-D lattice.

In an embodiment of the methods provided herein, the low VI components comprise multi-ring naphthenic molecules. In an embodiment, the step of separating the multi-ring naphthenes is performed at a temperature between about 20° C. to about 300° C. at a pressure between about 600 psi and about 1500 psi. In an embodiment, the step of desorbing the adsorbent material is performed at a temperature between about 50° C. to about 225° C. at a pressure between about 600 psi and about 1000 psi.

In accordance with the various embodiments of the disclosure, the base stock product has a molecular weight between about 170 to about 1400. In an embodiment, the difference between the base stock product viscosity index and the hydrocarbon feedstock viscosity index is equal to or greater than 5 as measured by ASTM D 2270-74. In an embodiment, the feedstock has a viscosity index of less than or equal to 120. In an embodiment, the base stock product has a viscosity index of greater than 120.

In accordance with the various embodiments of the disclosure, the adsorbent material is a metal-organic framework (MOF) adsorbent. In an embodiment, the metal-organic framework adsorbent is a porous crystalline (exhibits a diffraction pattern resulting from molecular order) material comprised of metal functionalities (either individual cations or clusters of cations) connected by substantially organic linkers to form a repeating 2-D or 3-D lattice. In an embodiment, the at least some of the multi-ring naphthenes are adsorbed onto the metal-organic framework adsorbent.

In an embodiment, the metal-organic framework adsorbent is a porous crystalline material comprised of metals or metal clusters linked by substantially organic ligands that have a pore volume, as measured by nitrogen adsorption at 77K, of at least 0.5 cc/g, and which the pore volume has been corrected for any dense phase impurities or binders that may be present in the measured sample.

In an embodiment, the metal-organic framework adsorbent has a metal-organic framework having a plurality of tetravalent metal cations or clusters of tetravalent metal cations linked by carboxylate-bearing linkers.

In an embodiment, the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

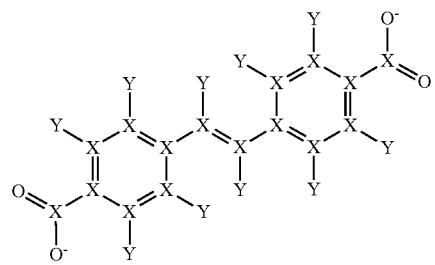

wherein X is independently carbon or nitrogen, and Y is independently hydrogen, an alkyl group, a halide group (F, Cl, Br, I), an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

In an embodiment, the metal-organic framework described herein can further contain other adsorbed species and cations such as fluoride, chloride, metal cations, or other pendant and detrital ligands.

In an embodiment, the metal-organic framework adsorbent has a porosity (pore volume) greater than about 0.5 cc/g, or greater than about 0.65 cc/g, or greater than about 0.75 cc/g, as measured by $N_2$ gas adsorption and corrected for any dense phase impurities or binders present.

In an embodiment, the metal-organic framework adsorbent has a mean crystal particle size less than about 5 microns, or less than about 3 microns, or less than about 2 microns.

In an embodiment, the metal-organic framework adsorbent has a mean crystal particle size within the range of from about 0.01 microns to about 5 microns, or from about 0.01 microns to about 3 microns, or from about 0.05 microns to about 2 microns.

In an embodiment, the metal-organic framework adsorbent can be compounded with a binder such as mesoporous organosilica, methocel, clays or oxides (actigel).

The metal-organic framework adsorbent can be utilized in any configuration, for example, longer beds, multiple beds, stacked beds, and the like. The metal-organic framework adsorbent can be combined with other adsorbent materials, if further molecular isolation is desired, e.g., adding a zeolite bed to further isolate isoparaffinic or normal paraffinic molecules.

Further provided herein are systems for making a high quality base stock comprising: an adsorption bed comprising a metal-organic framework (MOF) adsorbent, in which the metal-organic framework adsorbent is a porous crystalline material comprised of metal functionalities connected by organic linkers to form a repeating 2-D or 3-D lattice; a source of at least one hydrocarbon feedstock fluidically connected to the metal-organic framework adsorbent, in which the hydrocarbon feedstock comprises at least normal paraffins, isoparaffins, 1-ring naphthenes attached with a paraffinic alkyl chain, and multi-ring naphthenes; a source of one or more solvents fluidically connected to the metal-organic framework adsorbent; and a solvent recovery system in fluidic communication with the metal-organic framework adsorbent. The metal-organic framework adsorbent is contacted with the hydrocarbon feedstock and the solvent, at a temperature and pressure, to adsorb the multi-ring naphthenes from the hydrocarbon feedstock, thereby producing a base stock product that is depleted in multi-ring naphthenes. The base stock product has a viscosity index (VI) greater than the viscosity index of the hydrocarbon feedstock.

In accordance with the various embodiments of the disclosure, the present systems comprise a metal-organic framework adsorbent. In an embodiment, the systems of this disclosure can comprise one or more organic solvent nanofiltration membranes that are used for solvent recovery from a separated base stock product. In an embodiment, the systems of this disclosure can comprise one or more distillation columns for stripping solvent from the separated base stock product.

Hydrocarbon Feedstock

As used herein, a hydrocarbon feedstock is a liquid mixture of hydrocarbons. The hydrocarbon feedstock can contain: high-boiling hydrocarbons such as heavy oil fractions, vacuum distillate fractions derived from an atmospheric residue and/or distillate fractions obtained by vacuum distillation of a residual fraction which in return is obtained by atmospheric distillation of a crude oil; deasphalted atmospheric and vacuum residual oil fractions; hydrocrackate, waxy crudes, gas oils; one or more lube base stock; or mixtures of the same.

The boiling range of the hydrocarbon feedstock can vary. The hydrocarbon feedstock has a typical boiling range between 600° F. and 1500° F. ambient (at atmospheric pressure). To set the boiling point range for a hydrocarbon feedstock, an initial boiling point for a hydrocarbon feedstock and/or a final boiling point for a hydrocarbon feedstock can be used. Another option is to characterize a hydrocarbon feedstock based on the amount of the hydrocarbon feedstock that boils at one or more temperatures. For example, a "T5" boiling point/distillation point for a hydrocarbon feedstock is defined as the temperature at which 5 wt. % of the hydrocarbon feedstock will boil off. Similarly, a "T95" boiling point/distillation point is a temperature at which 95 wt. % of the hydrocarbon feedstock will boil. Boiling points, including fractional weight boiling points, can be determined using an appropriate ASTM test method, such as the procedures described in ASTM D2887, D2892, D6352, D7169 and/or D86.

Hydrocarbon feedstock as used in the various embodiments described herein include, for example, hydrocarbon feedstock having an initial boiling point or a T5 boiling point or T10 boiling point of at least 600° F. (~316° C.), or at least 650° F. (~343° C.), or at least 700° F. (~371° C.), or at least 750° F. (~399° C.). Additionally, or alternately, the final boiling point or T95 boiling point or T90 boiling point of the hydrocarbon feedstocks can be 1100° F. (~593° C.) or less, or 1050° F. (~566° C.) or less, or 1000° F. (~538° C.) or less, or 950° F. (~510° C.) or less. In particular, a hydrocarbon feedstock can have a T5 boiling point of at least 600° F. (~316° C.) and a T95 boiling point of 1100° F. (~593° C.) or less, or a T5 boiling point of at least 650° F. (~343° C.) and a T95 boiling point of 1050° F. (~566° C.) or less, or a T10 boiling point of at least 650° F. (~343° C.) and a T90 boiling point of 1050° F. (~566° C.) or less. It is possible, however, that the hydrocarbon feedstock has a lower boiling range portion. Such hydrocarbon feedstock can have an initial boiling point or a T5 boiling point or T10 boiling point of at least 350° F. (~177° C.), or at least 400° F. (~204° C.), or at least 450° F. (~232° C.). In particular, such a hydrocarbon feedstock can have a T5 boiling point of at least 350° F. (~177° C.) and a T95 boiling point of 1100° F. (~593° C.) or less, or a T5 boiling point of at least 450° F. (~232° C.) and a T95 boiling point of 1050° F. (~566° C.) or less, or a T10 boiling point of at least 350° F. (~177° C.) and T90 boiling point of 1050° F. (~566° C.) or less.

The hydrocarbon feedstock can contain aromatics and/or multi-ring molecules (e.g., multi-ring naphthenes) to be removed, a hydrotreated hydrocarbon stream (catalytically processed crude), and/or crude. For example, the hydrocarbon feedstock can be a waxy intermediate that has been hydrotreated and/or hydrorefined, a dewaxed hydrocarbon stream, and/or other hydrocarbon stream subject to a conversion process or hydroprocessing. The hydrocarbon feedstock has a carbon number in the range of C18 to C100+, and typically has a carbon number range between about C24 to C40.

In accordance to various embodiments, the hydrocarbon feedstock comprises an aromatic content of at least 20 wt. %, or at least 25 wt. %, or at least 30 wt. %, or at least 40 wt. %, or at least 50 wt. %, or at least 60 wt. %, such as up to 75 wt. % or up to 90 wt. %. In particular, the aromatics content can be 25 wt. % to 75 wt. %, or 25 wt. % to 90 wt. %, or 35 wt. % to 75 wt. %, or 35 wt. % to 90 wt. %. In other aspects, the hydrocarbon feedstock can have a lower aromatics content, such as an aromatics content of 35 wt. % or less, or 25 wt. % or less, such as down to 0 wt. %. In particular, the aromatics content can be 0 wt. % to 35 wt. %, or 0 wt. % to 25 wt. %, or 5.0 wt. % to 35 wt. %, or 5.0 wt. % to 25 wt. %. In an embodiment, the hydrocarbon feedstock has an aromatics content of about 25 wt. % to about 75 wt. %. The hydrocarbon feedstock typically has a low concentration of multi-ring naphthenes, for example, 1 wt. % to 35 wt. %, or 1 wt. % to 25 wt. %, or 1 wt. % to 15 wt. %, or 1 wt. % to 10 wt. %, or 1 wt. % to 5 wt. %, or 1 wt. % to 2.5 wt. %.

The hydrocarbon feedstock can have a sulfur content of 500 wppm to 20000 wppm or more, or 500 wppm to 10000 wppm, or 500 wppm to 5000 wppm. Additionally, or alternately, the nitrogen content of such a hydrocarbon feedstock can be 20 wppm to 4000 wppm, or 50 wppm to 2000 wppm. In some aspects, the hydrocarbon feedstock can correspond to a "sweet" hydrocarbon feedstock, so that the sulfur content of the hydrocarbon feedstock is 10 wppm to 500 wppm and/or the nitrogen content is 1 wppm to 100 wppm.

At least a portion of the hydrocarbon feedstock can comprise a hydrocarbon feedstock derived from a biocomponent source. The bicomponent refers to a hydrocarbon feedstock derived from a biological raw material component, from bicomponent sources such as vegetable, animal, fish, and/or algae. Vegetable fats/oils refer to any plant-based material, and can include fat/oils derived from a source such as plants of the genus Jatropha. The biocomponent sources can include vegetable fats/oils, animal fats/oils, fish oils, pyrolysis oils, and algae lipids/oils, as well as components of such materials, and in some embodiments can specifically include one or more type of lipid compounds. The biological compound can be one or more lipid compounds that are insoluble in water, but soluble in non-polar (or fat) solvents. Non-limiting examples of such solvents include alcohols, ethers, chloroform, alkyl acetates, benzene, and combinations thereof.

The hydrocarbon feedstock can contain waxes that boil in the lubricating oil range typically having a 10% distillation point at 200° C. or higher, ranging to 600° C., as measured by ASTM D-2887-93. Examples of waxes having significant amounts of waxy compounds are synthetic waxy raffinates (Fischer-Tropsch waxy raffinates), hydrocracker bottom fractions (hydrowax), slack waxes obtained from the dewaxing of hydroprocessed or solvent refined waxy distillates. Wax content (primarily linear paraffins) of the feedstock can be as high as at least 50 wt. %, or at least 80 wt. %, or at least 90 wt. %. The amount of wax can be determined by ASTM D3235.

As described immediately below, in an aspect, the hydrocarbon feedstock can be a lube base stock. As used herein, the lube base stock is also referred to as a "base stock". The lube base stock can be a refined lubricant stock, or a blend where the lube feed stock is combined with another refined lubricant stock (lube base stock) having different properties.

Lube Base Stock

Lube base stock is a liquid mixture of hydrocarbons. The lube base stock can contain mixtures of high-boiling hydrocarbons, such as heavy oil fractions, vacuum distillate fractions derived from an atmospheric residue (distillate fractions obtained by vacuum distillation of a residual fraction which in return is obtained by atmospheric distillation of a crude oil), de asphalted residual oil fractions, including both deasphalted atmospheric residues and deasphalted vacuum residues, hydrocrackate, waxy crudes, gas oils, and/or lube base stocks.

The lube base stock can contain waxes that boil in the lubricating oil range typically having a 10% distillation point at 200° C. or higher, ranging to 600° C., as measured by ASTM D2887 or D7169. Examples of waxes having relatively high amounts of waxy compounds are synthetic waxy raffinates (Fischer-Tropsch waxy raffinates), hydrocracker bottom fractions (hydrowax), i.e., fractions having a final boiling point of at least 320° C., at least 340° C., or at least 360° C. and slack waxes obtained from the dewaxing of hydroprocessed or solvent refined waxy distillates. These waxes have a wax content of at least 50 wt. %, or at least 80 wt. %, or at least 90 wt. %. The amount of wax can be determined by ASTM D3235. Waxy molecules include linear paraffins.

The lube base stock can be a refined lubricant stock used by itself, or it can be blended with another refined lubricant stock having different properties. Prior to use the lube base stock can be compounded with one or more additives which function, for example, as antioxidants, extreme pressure additives and/or VI improvers. The lube base stock additionally contains waxy components which are n- or isoparaffins, and the majority of the lube base stock can be expected to have a boiling point above 250° C.

If the lube base stock contains sulfur and/or nitrogen contaminants, for example, with the amount of sulfur up to 3 wt. % and the amount of nitrogen up to 1 wt. %, it can be advantageous to subject the lube base stock to catalytic hydrodesulfurization or catalytic de-nitrogenation prior to the separation process of the present methodologies. Furthermore, the lube base stock can have been hydrotreated and/or hydrocracked before being subjected to separation.

Lube base stocks are distinguished by viscosity and are produced to certain viscosity specifications. Since viscosity is approximately related to molecular weight, the first step in manufacturing a base stock is to separate out lube precursor molecules of feedstock having the correct molecular weight range by distillation in a crude fractionation system. Lower-boiling fuel products of low viscosities and volatilities that have no application in lubricants are distilled off. Therefore, higher molecular weight hydrocarbon feedstocks (which do not vaporize at atmospheric pressure) can be fractionated by distillation at reduced pressure between about 10 mmHg to about 50 mmHg. The higher molecular weight hydrocarbon feedstock is then fed to a vacuum tower where intermediate product streams such as light vacuum gas oil ("LVGO") and heavy vacuum gas oil ("HVGO") are produced. These intermediate product streams can be narrow cuts of specific viscosities destined for a solvent refining step, or they can be broader cuts destined for hydrocracking to lubes and fuels.

As used herein, the lube base stock can have a kinematic viscosity at 100° C. of about 1.5 cSt to about 35 cSt, or 1.5 cSt to 30 cSt, or 1.5 cSt to 25 cSt, or 1.5 cSt to 20 cSt, or 1.5 cSt to 16 cSt, or 1.5 cSt to 12 cSt, or 1.5 cSt to 10 cSt, or 1.5 cSt to 8 cSt, or 1.5 cSt to 6 cSt, or 1.5 cSt to 5 cSt, or 1.5 cSt to 4 cSt, or 2.0 cSt to 35 cSt, or 2.0 cSt to 30 cSt, or 2.0 cSt to 25 cSt, or 2.0 cSt to 20 cSt, or 2.0 cSt to 16 cSt, or 2.0 cSt to 12 cSt, or 2.0 cSt to 10 cSt, or 2.0 cSt to 8 cSt, or 2.0 cSt to 6 cSt, or 2.0 cSt to 5 cSt, or 2.0 cSt to 4 cSt, or 2.5 cSt to 35 cSt, or 2.5 cSt to 30 cSt, or 2.5 cSt to 25 cSt, or 2.5 cSt to 20 cSt, or 2.5 cSt to 16 cSt, or 2.5 cSt to 12 cSt, or 2.5 cSt to 10 cSt, or 2.5 cSt to 8 cSt, or 2.5 cSt to 6 cSt, or 2.5 cSt to 5 cSt, or 2.5 cSt to 4 cSt, or 3.0 cSt to 35 cSt, or 3.0 cSt to 30 cSt, or 3.0 cSt to 25 cSt, or 3.0 cSt to 20 cSt, or 3.0 cSt to 16 cSt, or 3.0 cSt to 12 cSt, or 3.0 cSt to 10 cSt, or 3.0 cSt to 8 cSt, or 3.0 cSt to 6 cSt, or 3.5 cSt to 35 cSt, or 3.5 cSt to 30 cSt, or 3.5 cSt to 25 cSt, or 3.5 cSt to 20 cSt, or 3.5 cSt to 16 cSt, or 3.5 cSt to 12 cSt, or 3.5 cSt to 10 cSt, or 3.5 cSt to 8 cSt, or 3.5 cSt to 6 cSt.

Additionally, or alternately, the lube base stock can have a viscosity index of about 50 to about 120, or 60 to 120, or 70 to 120, or 80 to 120, or 90 to 120, or 100 to 120, or 50 to 110, or 60 to 110, or 70 to 110, or 80 to 110, or 90 to 110, or 50 to 100, or 60 to 100, or 70 to 100, or 80 to 100, or 50 to 90, or 60 to 90, or 70 to 90, or 50 to 80, or 60 to 80.

As an alternative to characterizing the lube base stock based on viscosity index, a lube base stock can be characterized based on the paraffin content of the feed. In such aspects, a lube base stock for forming a high viscosity base stock can have a paraffin content of at least about 30 wt. %, or at least about 35 wt. %.

Additionally, or alternately, the lube base stock can have a density at 15.6° C. of about 0.91 g/cm³ or less, or about 0.90 g/cm³ or less, or about 0.89 g/cm³ or less, or about 0.88 g/cm³, or about 0.87 g/cm³, such as down to about 0.84 g/cm³ or lower.

The molecular weight of the lube base stock can be characterized based on number average molecular weight (corresponding to the typical average weight calculation), and/or based on mass or weight average molecular weight, where the sum of the squares of the molecular weights is divided by the sum of the molecular weights, and/or based on polydispersity, which is the weight average molecular weight divided by the number average molecular weight.

The number average molecular weight Mn of a feed can be mathematically expressed as $$M_n = \frac{\sum_i N_i M_i}{\sum_i N_i} \quad (1)$$

In Equation (1), $N_i$ is the number of molecules having a molecular weight M. The weight average molecular weight, Mw, gives a larger weighting to heavier molecules. The weight average molecular weight can be mathematically expressed as $$M_w = \frac{\sum_i N_i M_i^2}{\sum_i N_i M_i} \quad (2)$$

The polydispersity can then be expressed as Mw/Mn. In various aspects, the lube base stock can have a polydispersity of 1.30 or less, or 1.25 or less, or 1.20 or less, and/or at least about 1.0. Additionally, or alternately, the lube base stock can have a number average molecular weight (Mn) of 300 to 1000 g/mol. Additionally, or alternately, the lube base stock can have a weight average molecular weight (Mw) of 500 to 1200 g/mol.

As described herein, the lube base stock comprises a hydrocarbon feedstock that is any one or more of a wide variety of petroleum and chemical feedstocks. In accordance with various embodiments of the disclosure, and by way of example, hydrocarbon feedstocks can be whole and reduced petroleum crudes, atmospheric, cycle oils, gas oils, including vacuum gas oils and coker gas oils, light to heavy distillates including raw virgin distillates, hydrocrackates, hydrotreated oils, petroleum-derived waxes (including slack waxes), Fischer-Tropsch waxes, raffinates, deasphalted oils and mixtures of these materials. Hydrocarbon feedstocks also include deasphalted oil (DAO), vacuum gas oil (VGO), vacuum distillates, intermediate streams, or combinations thereof.

In accordance with various embodiments of the disclosure, the lube base stock (hydrocarbon feedstock stream) can be VGO/distillate straight from a 'fuels' based atmospheric/vacuum distillation tower. VGO/distillate from a 'lubes' based vacuum distillation tower, hydroprocessed VGO/distillate/DAO. In some embodiments, the hydrocarbon feedstock is a stream of Group II or III base stock.

Lube base stocks can contain between 2-20% being additives to improve performance. The lube base stock has a typical boiling range between 600° F. and 1100° F. at atmospheric pressure. The lube base stock can be produced from a vacuum gas oil fraction and residue (a high-boiling region) of crude oil and boiling ranges of the lube base stock can vary. Base stocks are grouped via a sulfur, saturate, and viscosity index criteria and are frequently characterized by their density, kinematic viscosity at 40° C. and 100° C., pour point, and cloud point.

Lube base stocks are typically a fluid at the operating temperature of the lubricant and used to formulate a lubricant by admixing with other components. As described herein, non-limiting examples of base stocks suitable in lubricants include API Group I, Group II, Group III, Group IV, and Group V base stocks.

Lube base stocks are generally classified into two broad types—naphthenic and paraffinic—depending on the crude types they are derived from. Naphthenic crudes are characterized by the absence of wax or have very low levels of wax. Therefore, naphthenic crudes are largely cycloparaffinic and aromatic in composition. Furthermore, naphthenic lube fractions without any dewaxing are generally liquid at low temperatures. On the other hand, paraffinic crudes contain cycloparaffins, aromatics and wax; wax being largely n- and iso-paraffins which have high melting points.

The lube base stock can be a natural oil or a combination of natural oils. Natural oils (or mixtures thereof) can be used unrefined, refined, or re-refined (the latter is also known as reclaimed or reprocessed oil). Unrefined oils are those obtained directly from a natural source and used without added purification. These include shale oil obtained directly from retorting operations, petroleum oil obtained directly from primary distillation, and ester oil obtained directly from an esterification process. Refined oils are similar to unrefined oils except refined oils are subjected to one or more purification steps to improve the at least one lubricating oil property.

To produce the lube base stock, in accordance with the various embodiments of the disclosure, process steps can include solvent extraction, secondary distillation, acid extraction, base extraction, filtration, percolation, oligomerization and dimerizations of olefins including poly alpha olefins, poly internal olefins and bio-derived base stocks. Re-refined oils are obtained by processes analogous to refined oils but using an oil that has been previously used as a feedstock. Natural oils vary as to the method used for their production and purification, for example, their distillation range and whether they are straight run or cracked, hydrorefined, or solvent extracted. Feedstock can also include used oils, pretreated oils and other recycled materials.

Also, natural oils can include animal oils, vegetable oils (castor oil and lard oil, for example), and mineral oils. Animal and vegetable oils possessing favorable thermal oxidative stability can be used. Of the natural oils, mineral oils can vary widely as to their crude source, for example, as to whether they are paraffinic, naphthenic, or mixed paraffinic-naphthenic.

Groups I, II, III, IV and V are broad categories of base stocks. See e.g., API Publication 1509. Group I base stocks generally have a viscosity index of from 80 to 120 and contain greater than 0.03% sulfur and less than 90% saturates. Group II base stocks generally have a viscosity index of from 80 to 120 and contain less than or equal to 0.03% sulfur and greater than or equal to 90% saturates. Group III base stocks generally have a viscosity index greater than 120 and contains less than or equal to 0.03% sulfur and greater than 90% saturates. Group IV base stocks include polyalphaolefins. Group V base stocks include base stocks not included in Groups I-IV. Table 1 below summarizes properties of each of these five groups.

TABLE 1

| Lube Base Stock Properties | | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | Includes PAO products | | |
| Group V | All other base stocks not included in Groups I, II, III, or IV | | |

Group II and/or Group III base stocks are hydroprocessed and/or hydrocracked base stocks. According to various embodiments, the base stock is a Group II or a Group II base stock or a blend of base stocks, including for example, without limitation, multiple Group II and/or Group III base stocks. According to various embodiments of the present disclosure, a Group II and/or Group III base stock can be used in combination with a synthetic oil. Synthetic oils include hydrocarbon oil such as polymerized and interpolymerized olefins such as polybutylenes, polypropylenes, propylene isobutylene copolymers, ethylene-olefin copolymers, and ethylene-alpha-olefin copolymers, for example. Polyalpha-olefin oil base stocks, the Group IV API base stocks, can be used as base stock. By way of example, PAOs derived from $C_8$, $C_{10}$, $C_{12}$, $C_{14}$ olefins or mixtures thereof can be utilized. See U.S. Pat. Nos. 4,956,122; 4,827,064; and 4,827,073. Group IV hydrocarbons and base stocks have viscosity indices greater than about 130, greater than about 135, and greater than about 140.

Examples of Group II base stocks can be EHC-45 (VI of 113-119, KV40 of 4.4-4.7 cSt, NOAK of 15 wt. %), 100R (VI of 117, KV40 of 4.4 cSt, NOAK of 16 wt. %), aramcoPRIMA 100 (VI of 105, KV40 of 4.17 cSt, NOAK of 23 wt. %), aramcoPRIMA 110 (VI of 113, KV40 of 4.6 cSt, NOAK of 14 wt. %). Examples of the Group III base stock are armacoULTRA (VI of 124, KV40 of 4.27 cSt, NOAK of 14.7 wt. %), Yubase4 (VI of 122, KV40 of 4.23 cSt, NOAK of 15 wt. %), NEXBASE 3043 (VI of 123, KV40 of 4.3 cSt, NOAK of 14.4 wt. %.

As described herein, the lube feed stock can comprise one or more base stocks. The base stock can have a kinematic viscosity at 100° C. ("KV100"), measured according to ASTM standard D-445, from about 4.0 cSt to about 7.0 cSt, about 5.0 cSt to about 6.0 cSt. Base stocks can have a kinematic viscosity at 40° C. ("KV40"), measured according to ASTM standard D-445, from about 18 cSt to about 42 cSt and from about 15 cSt to about 40 cSt. The base stocks have a viscosity index, calculated according to ASTM standard D-2270, from about 80 to about 150 and from about 105 to about 142.

Base stocks can have a NOACK volatility of no greater than about 35%, no greater than about 30%, and/or no greater than about 25%. Base stock can have a Noack volatility of between about 7.0 wt. % to about 15.0 wt. %. As used herein, Noack volatility is determined by ASTM D-5800.

Additionally, or alternatively, the base stocks can have a pour point of less than about −20° C., less than about −40° C., less than about −50° C., less than about −60° C. Also, the base stocks can have a pour point of between about −15° C. and −60° C.

As described above, the hydrocarbon feedstock has hydrocarbons in the lubricant (lube) range. For example, the hydrocarbon feedstock can include hydrocarbons having equal to or greater than about 12 carbon atoms. Particularly, and not by way of limitation, the hydrocarbon feed stock can include paraffins having from 12 to 100 carbon atoms, or 12 to 40 carbon atoms. The hydrocarbon feedstock for use in the presently disclosed subject matter can be derived from any one of a variety of sources including crude oil and/or petroleum, or other suitable source, e.g., synthetic oils, Fischer-Tropsch oils, shale oils and/or blends thereof.

The hydrocarbon feedstock can include normal paraffins (i.e., n-paraffins), branched paraffins (i.e., iso-paraffins), cyclic paraffins (i.e., naphthenes) or combinations thereof. For example, and not by way of limitation, the hydrocarbon feedstock can include up to about 95% n-paraffins. Non-limiting examples of n-paraffins that can be present in the hydrocarbon feedstock can include eicosane ($C_{20}H_{42}$), henicosane ($C_{21}H_{44}$), docosane ($C_{22}H_{46}$), tricosane ($C_{23}H_{48}$), tetracosane ($C_{24}H_{50}$), pentacosane ($C_{25}H_{52}$), triacontane ($C_{34}H_{62}$), dotriacontane ($C_{32}H_{66}$), pentatriacontane ($C_{35}H_{72}$), and tetracontane ($C_{44}H_{182}$). Additionally, or alternatively, the hydrocarbon feedstock can comprise less than or equal to 50 wt. % iso-paraffins. Non-limiting examples of iso-paraffins that can be present in the hydrocarbon feedstock can include 2-methylhexadecane ($C_{17}H_{36}$), 7-methylhexadecane ($C_{17}H_{36}$), pristane ($C_{19}H_{46}$) and squalane ($C_{36}H_{62}$). Furthermore, the hydrocarbon feedstock can include up to about 100% naphthenes. Non-limiting examples of naphthenes that can be present in the hydrocarbon feedstock can include, but are not limited to, n-octadecyl-c-hexane ($C_{24}H_{48}$) and cholestane ($C_{27}H_{48}$).

The present methods include contacting the hydrocarbon feedstock with a metal-organic framework adsorbent to adsorb multi-ring naphthenes from a hydrocarbon feedstock. The hydrocarbon feedstock can be contacted with the metal-organic framework adsorbent under conditions that adsorb the multi-ring naphthenes from the hydrocarbon feedstock to result in a base stock product that is depleted in multi-ring naphthenes. For example, and not by way of limitation, the metal-organic framework adsorbent can retain up to about 25%, or up to about 50%, or up to about 75%, or greater, of the multi-ring naphthenes initially present in the hydrocarbon feedstock.

Contacting the hydrocarbon feedstock with a metal-organic framework adsorbent can be performed using a variety of known techniques. For example, the hydrocarbon feedstock can contact a bed of a one or more metal-organic framework adsorbents in a down flow direction (e.g., flow directed by gravity or controlled by pumps). In non-limiting embodiments, the metal-organic framework adsorbent can be present in one or more columns and the hydrocarbon feedstock can be applied to a column containing the one or more metal-organic framework adsorbents. The metal-organic framework adsorbent can be in the form of pallets or spheres in the randomly packed bed or structured packed bed or a monolith form. The metal-organic framework adsorbent can be in a fixed bed or rotary wheel (moving bed) or true moving bed.

As provided herein, the metal-organic framework adsorbent can be in any form. For example, and not by way of limitation, the metal-organic framework adsorbent can be used in the form of beaded particles, crushed particles or extruded particles. The metal-organic framework adsorbent can be used alone, or in association with known binders. In accordance with another aspect of the disclosed subject matter, the methods disclosed herein can further include analyzing and quantifying the separated base stock products. For example, and not by way of limitation, the separated base stock products generated by the disclosed method can be further analyzed by gas chromatography, gas chromatography-mass spectrometry, nuclear magnetic resonance and/or 2D-gas chromatography for quantification of the n-paraffins, iso-paraffins, one-ring and multi-ring naphthenes that were present in the hydrocarbon feedstock.

In the present methods, the hydrocarbon feedstock contacts the metal-organic framework adsorbent in the presence of one or more solvents, e.g., a non-polar solvent. For example, and not by way of limitation, the solvent can contact the metal-organic framework adsorbent prior to and/or after the contact of the hydrocarbon feedstock with the adsorbent. Alternatively, the hydrocarbon feedstock contacts the metal-organic framework adsorbent concomitantly with the solvent. Non-limiting examples of solvents include pentane, iso-pentane, hexane, iso-hexane, heptane, iso-heptane, octane, iso-octane, cyclohexane, methyl cyclohexane, or combinations thereof. For example, the solvent can include iso-octane. In an embodiment, the solvent can include heptane and iso-octane at an amount of about 10% heptane in iso-octane. The solvent can be any hydrocarbon stream consisting of naphtha, kerosene, diesel or any narrow boiling cut of them or any wide boiling mixture of them. The solvent can be liquid ammonia, $CO_2$, ethane, propane, butane, iso-butane or any mixture of them.

The solvent to hydrocarbon feedstock ratio required to achieve separation of the multi-ring naphthenes is between about 1 unit to about 50 unit, about 1 unit to about 20 unit or about 1 unit to about 2 unit. The solvent can be a mixture of paraffin, isoparaffin, naphthene, and aromatics and include one or more lower paraffins and/or higher paraffin, collectively referred to as "paraffin" together with or without naphtha, kerosene and the like. A "lower paraffin," includes a paraffin that has one to eight carbon atoms. A "higher paraffin" includes a paraffin that has nine or more carbon atoms. The solvent can comprise between about 10 to 100 wt. % of paraffin. The solvent has a boiling point less than about 300° C. The solvent can be a non-hydrocarbon molecule such as $CO_2$ and $NH_3$.

Illustrative suitable solvents include, for example, linear and branched paraffins, and mixtures thereof. Naphthenic solvents (like cyclohexane, methyl cyclohexane, etc.) can also be used in the mixtures. Linear paraffins are weakly competing solvents and iso-paraffins/naphthenes are strongly competing solvents.

The present methods can include contacting a hydrocarbon feed flow through of the metal-organic framework adsorbent. Application of the flow through the metal-organic framework adsorbent can be used to adsorb multi-ring naphthenes. In the context of when more than one adsorbent is utilized, the flow through can contact the second adsorbent material in the presence of the solvent.

The Present Systems

Figure 2:
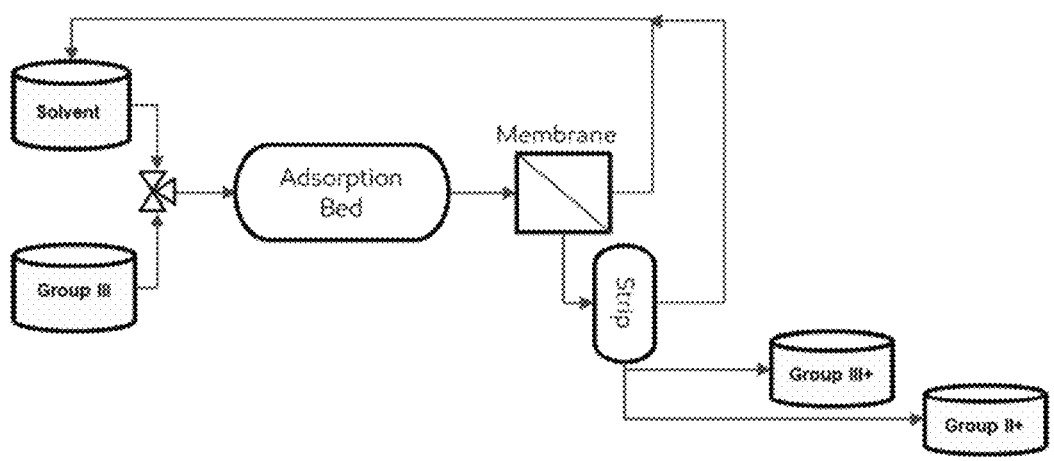
FIG. 2 depicts a separation process scheme of this disclosure having solvent recovery and using a Group III base stock as the feedstock.

As described herein, the present methods can utilize one or more adsorption beds, filled with a suitable metal-organic framework adsorbent or adsorbents, and a solvent recovery system that can separate solvents used from the separated lubricating oil (base stock) products. FIG. 2 shows an exemplary system for making high quality base stock that can utilize the present methodologies. As shown in FIG. 2, an adsorption bed can consist of a single column or multiple columns (not shown). The columns (not shown) can be configured as a simulated moving bed. In an embodiment, the columns (not shown) can be configured as cyclic swing beds. In an embodiment, a metal-organic framework adsorbent is the adsorbent that selectively adsorbs multi-ring naphthenes in the hydrocarbon feedstock. The adsorbent (not shown) can be formed and sized with a suitable binder such as silica or alumina to control pressure drop and mass transfer characteristics.

In accordance with the various embodiments of the disclosure, the hydrocarbon feedstock containing multi-ring naphthenes is fed to the adsorption bed along with a suitable amount of solvent to carry out the separation. As described herein, Group II (or Group II+), and Group III lubricating base oils are exemplary hydrocarbon feedstocks. As shown in FIG. 2, solvent can be recovered from separated base stock by distillation, and returned to the adsorption bed. Solvent recovery methods include nanofiltration, fractionation, steam stripping and nitrogen stripping. In an embodiment, one or more organic solvent nanofiltration membranes can be utilized for solvent recovery from separated base stock and prior to the final distillation, the "stripping" step. Recovered solvent is returned to the adsorption process.

One solvent or a combination of solvents can be used to elute the adsorbed multi-ring naphthenes from the adsorption bed. In an embodiment, the solvent is a low boiling naphtha. Components in the low boiling naphtha can include n-paraffins, such as n-hexane, n-heptane, n-octane, up to n-dodecane. Non-absorbing or weakly adsorbing solvents can be used to facilitate recovery of the base stock. In an embodiment, solvent can include highly branched paraffins in the naphtha boiling range.

Illustrative solvents include, for example, non-polar solvents, saturated hydrocarbon solvents, aromatic hydrocarbon solvents, and mixtures thereof. In particular, suitable solvents include n-hexane, n-heptane, isooctane, toluene, and the like. n-Paraffins can facilitate adsorption as they are weakly competing solvents. Desorption is facilitated by isoparaffinic or naphthenic solvents as they are strongly competing solvents.

In an embodiment, the adsorption of multi-ring naphthenes from the hydrocarbon feedstock is conducted at the lowest possible temperatures to maximize adsorbent capacity at the same time higher temperature is necessary to make adsorption happen faster. Temperatures from ambient or about 20° C. to about 300° C. are suitable or about 100° C. to about 200° C. Low temperature adsorptions are facilitated by the low pour point of the base oils. Desorption is facilitated by higher solvent temperatures. Temperatures from about 50° C. to about 300° C. are suitable or about 100° C. to about 200° C.

In an embodiment, the adsorption of multi-ring naphthenes from the hydrocarbon feedstock is conducted at a pressure from about 600 psi to about 1500 psi, or from about 600 psi to about 1000 psi. Desorption is facilitated at pressures from about 600 psi to about 1500 psi, or from about 600 psi to about 1000 psi.

Depending on the feedstock used in the method of this disclosure, the concentration of multi-ring naphthenes in the feedstock is greater than about 5 wt %, or greater than about 10 wt %, or greater than about 15 wt %, or greater than about 20 wt %, or greater than about 25 wt %, or greater than about 30 wt %, or greater than about 35 wt %, or greater than about 40 wt %, or greater than about 45 wt %, or greater than about 50 wt %, based on the total weight of the feedstock.

Depending on the feedstock treated to yield product in accordance with the method of this disclosure, the concentration of multi-ring naphthenes in the product is less than about 20 wt %, or less than about 17.5 wt %, or less than about 15 wt %, or less than about 12.5 wt %, or less than about 10 wt %, or less than about 7.5 wt %, or less than about 5 wt %, or less than about 2.5 wt %, or less than about 2.0 wt %, or less than about 1.0 wt %, based on the total weight of the product.

The base stock product produced in accordance with this disclosure is depleted in multi-ring naphthenes vis-a-vis the feedstock. In an embodiment, the feedstock and base stock product of this disclosure can have a multi-ring naphthene weight ratio (feedstock:base stock product) ranging, for example, from about 1.1:1 to about 10:0.01, or about 1.25:1 to about 10:0.05, or about 1.5:1 to about 10:0.1, or about 1.75:1 to about 10:0.25, or about 2:1 to about 10:0.5, or about 2.25:1 to about 10:0.75, or about 2.5:1 to about 10:1.

The following are preferred embodiments of this disclosure.

Embodiment 1. A method for separating multi-ring naphthenes from a hydrocarbon feedstock, wherein the hydrocarbon feedstock comprises at least normal paraffins, isoparaffins, 1-ring naphthenes attached with a paraffinic alkyl chain, and multi-ring naphthenes, said method comprising passing the hydrocarbon feedstock and a solvent, at a temperature and pressure through a bed of an adsorbent comprising a metal-organic framework (MOF) adsorbent, to adsorb the multi-ring naphthenes from the hydrocarbon feedstock, thereby producing a base stock product that is depleted in multi-ring naphthenes; wherein the metal-organic framework adsorbent is a porous crystalline material comprised of metal functionalities connected by organic linkers to form a repeating 2-D or 3-D lattice; and wherein the base stock product has a viscosity index (VI) greater than the viscosity index of the hydrocarbon feedstock.

Embodiment 2. The method of embodiment 1, wherein the hydrocarbon feedstock has a viscosity index less than 120.

Embodiment 3. The method of embodiment 1, wherein the base stock product has a viscosity index of greater than or equal to 120.

Embodiment 4. The method of embodiment 1, wherein the difference between the base stock product viscosity index and the hydrocarbon feedstock viscosity index is equal to or greater than 5, as measured by ASTM D 2270-74.

Embodiment 5. The method of embodiment 1, wherein the hydrocarbon feedstock comprises a feed base stock selected from the group consisting of a Group II base stock and a Group III base stock.

Embodiment 6. The method of embodiment 1, wherein the base stock product is selected from the group consisting of a Group II base stock, a Group II+ base stock, a Group III base stock, and a Group III+ base stock.

Embodiment 7. The method of embodiment 1, wherein the hydrocarbon feedstock is a Group II base stock, and the base stock product is a Group II+ base stock, a Group III base stock, or a Group III+ base stock.

Embodiment 8. The method of embodiment 1, wherein the hydrocarbon feedstock is a Group III base stock, and the base stock product is a Group III+ base stock.

Embodiment 9. The method of embodiment 1, wherein the multi-ring naphthenes are selected from the group consisting of 2-ring naphthenes, 3-ring naphthenes, 4-ring naphthenes, 5-ring naphthenes, and 5-ring+ naphthenes.

Embodiment 10. The method of embodiment 1, wherein the metal-organic framework adsorbent is a porous crystalline material comprised of metals or metal clusters linked by organic ligands that have a pore volume, as measured by nitrogen adsorption at 77K, of at least 0.5 cc/g.

Embodiment 11. The method of embodiment 1, wherein the metal-organic framework adsorbent has a metal-organic framework having a plurality of tetravalent metal cations or clusters of tetravalent metal cations linked by carboxylate-bearing linkers.

Embodiment 12. The method of embodiment 1, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

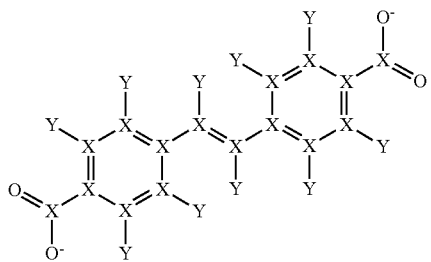

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

Embodiment 13. The method of embodiment 1, wherein the metal-organic framework adsorbent has a mean crystal particle size less than about 5 microns, or less than about 3 microns, or less than about 2 microns.

Embodiment 14. The method of embodiment 1, wherein the metal-organic framework adsorbent has a mean crystal particle size within the range of from about 0.01 microns to about 5 microns, or from about 0.01 microns to about 3 microns, or from about 0.05 microns to about 2 microns.

Embodiment 15. The method of embodiment 1, wherein the base stock product has a kinematic viscosity at 100° C. (KV100) from about 4.0 cSt to about 7.0 cSt, or from about 4.0 cSt to about 6.0 cSt, measured according to ASTM standard D-445.

Embodiment 16. The method of embodiment 1, wherein the base stock product has a kinematic viscosity at 40° C. (KV40) from about 15 cSt to about 42 cSt, or from about 18 cSt to about 40 cSt, measured according to ASTM standard D-445.

Embodiment 17. The method of embodiment 1, wherein the hydrocarbon feedstock has a viscosity index from greater than or equal to 80 to less than 120, or from about 90 to less than 120, measured according to ASTM standard D-2270.

Embodiment 18. The method of embodiment 1, wherein the base stock product has a viscosity index from greater than or equal to 120 to about 150, or from about 130 to about 150, measured according to ASTM standard D-2270.

Embodiment 19. The method of embodiment 1, further comprising recovering the solvent to produce a recovered solvent.

Embodiment 20. The method of embodiment 1, further comprising contacting one or more nanofiltration membranes with the base stock product to recover the solvent from the base stock product.

Embodiment 21. The method of embodiment 1, further comprising contacting one or more distillation columns with the base stock product for stripping the solvent from the base stock product.

Embodiment 22. The method of embodiment 19, wherein the metal-organic framework adsorbent is contacted with the recovered solvent.

Embodiment 23. The method of embodiment 1, wherein the solvent is selected from the group consisting of pentane, iso-pentane hexane, iso-hexane, heptane, iso-heptane, octane, iso-octane, cyclohexane, methyl cyclohexane, and mixtures thereof.

Embodiment 24. The method of embodiment 1, wherein a Group II base stock is converted to a Group II+ base stock, a Group III base stock, or a Group III+ base stock, at a yield greater than about 50%, or greater than about 75%, or greater than about 80%.

Embodiment 25. The method of embodiment 1, wherein a Group III base stock is converted to a Group III+ base stock, at a yield greater than about 50%, or greater than about 75%, or greater than about 80%.

Embodiment 26. The method of embodiment 1, wherein separating the multi-ring naphthenes from the hydrocarbon feedstock is performed at a temperature from about 20° C. to about 300° C., and at a pressure from about 600 psi to about 1500 psi.

Embodiment 27. The method of embodiment 1, wherein separating the multi-ring naphthenes from the hydrocarbon feedstock is performed at a temperature from about 50° C. to about 225° C., and at a pressure from about 600 psi to about 1000 psi.

Embodiment 28. The method of embodiment 1, further comprising desorbing the metal-organic framework adsorbent to regenerate the metal-organic framework adsorbent.

Embodiment 29. The method of embodiment 1, further comprising desorbing the metal-organic framework adsorbent by contacting with a desorbing solvent.

Embodiment 30. The method of embodiment 29, wherein the desorbing solvent is a paraffinic solvent, an isoparaffinic solvent or a naphthenic solvent.

Embodiment 31. The method of embodiment 28, wherein desorbing the metal-organic framework adsorbent is conducted at a temperature from about 20° C. to about 300° C., and a pressure from about 600 psi to about 1500 psi.

Embodiment 32. The method of embodiment 28, wherein desorbing the metal-organic framework adsorbent is conducted at a temperature from about 50° C. to about 225° C., and a pressure from about 600 psi to about 1000 psi.

Embodiment 33. The method of embodiment 1, further comprising multiple adsorbent beds having the same or different adsorbent materials.

Embodiment 34. A method of upgrading a Group II base stock to a Group II+, Group III or Group III+ base stock, wherein the Group II base stock comprises at least normal paraffins, isoparaffins, 1-ring naphthenes attached with a paraffinic alkyl chain, and multi-ring naphthenes, said method comprising passing the Group II base stock and a solvent, at a temperature and pressure through a bed of an adsorbent comprising a metal-organic framework (MOF) adsorbent, to adsorb the multi-ring naphthenes from the Group II base stock, thereby producing a Group II+, Group III or Group III+ base stock that is depleted in multi-ring naphthenes; wherein the metal-organic framework adsorbent is a porous crystalline material comprised of metal functionalities connected by organic linkers to form a repeating 2-D or 3-D lattice.

Embodiment 35. The method of embodiment 34, wherein the Group II base stock has a viscosity index less than 120.

Embodiment 36. The method of embodiment 34, wherein the Group II+, Group III or Group III+ base stock has a viscosity index of greater than or equal to 120.

Embodiment 37. The method of embodiment 34, wherein the difference between the Group II+, Group III or Group III+ base stock viscosity index and the Group II base stock viscosity index is equal to or greater than 5, as measured by ASTM D 2270-74.

Embodiment 38. The method of embodiment 34, wherein the multi-ring naphthenes are selected from the group consisting of 2-ring naphthenes, 3-ring naphthenes, 4-ring naphthenes, 5-ring naphthenes, and 5-ring+ naphthenes.

Embodiment 39. The method of embodiment 34, wherein the metal-organic framework adsorbent is a porous crystalline material comprised of metals or metal clusters linked by organic ligands that have a pore volume, as measured by nitrogen adsorption at 77K, of at least 0.5 cc/g.

Embodiment 40. The method of embodiment 34, wherein the metal-organic framework adsorbent has a metal-organic framework having a plurality of tetravalent metal cations or clusters of tetravalent metal cations linked by carboxylate-bearing linkers.

Embodiment 41. The method of embodiment 34, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

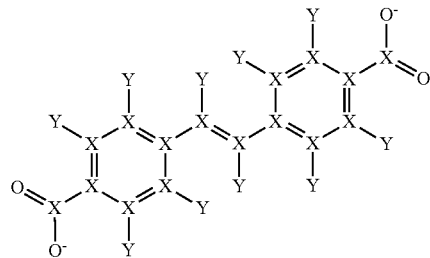

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

Embodiment 42. The method of embodiment 34, wherein the metal-organic framework adsorbent has a mean crystal particle size less than about 5 microns, or less than about 3 microns, or less than about 2 microns.

Embodiment 43. The method of embodiment 34, wherein the metal-organic framework adsorbent has a mean crystal particle size within the range of from about 0.01 microns to about 5 microns, or from about 0.01 microns to about 3 microns, or from about 0.05 microns to about 2 microns.

Embodiment 44. The method of embodiment 34, wherein the Group II+, Group III or Group III+ base stock has a kinematic viscosity at 100° C. (KV100) from about 4.0 cSt to about 7.0 cSt, or from about 4.0 cSt to about 6.0 cSt, measured according to ASTM standard D-445.

Embodiment 45. The method of embodiment 34, wherein the Group II+, Group III or Group III+ base stock has a kinematic viscosity at 40° C. (KV40) from about 15 cSt to about 42 cSt, or from about 18 cSt to about 40 cSt, measured according to ASTM standard D-445.

Embodiment 46. The method of embodiment 34, wherein the Group II base stock has a viscosity index from greater than or equal to 80 to less than 120, or from about 90 to less than 120, measured according to ASTM standard D-2270.

Embodiment 47. The method of embodiment 34, wherein the Group II+, Group III or Group III+ base stock has a viscosity index from greater than or equal to 120 to about 150, or from about 130 to about 150, measured according to ASTM standard D-2270.

Embodiment 48. The method of embodiment 34, further comprising recovering the solvent to produce a recovered solvent.

Embodiment 49. The method of embodiment 34, further comprising contacting one or more nanofiltration membranes with the Group II+, Group III or Group III+ base stock to recover the solvent from the Group II+, Group III or Group III+ base stock.

Embodiment 50. The method of embodiment 34, further comprising contacting one or more distillation columns with the Group II+, Group III or Group III+ base stock for stripping the solvent from the Group II+, Group III or Group III+ base stock.

Embodiment 51. The method of embodiment 48, wherein the metal-organic framework adsorbent is contacted with the recovered solvent.

Embodiment 52. The method of embodiment 34, wherein the solvent is selected from the group consisting of pentane, iso-pentane, hexane, iso-hexane, heptane, iso-heptane, octane, iso-octane, cyclohexane, methyl cyclohexane, and mixtures thereof.

Embodiment 53. The method of embodiment 34, wherein a Group II base stock is converted to a Group II+ base stock, a Group III base stock, or a Group III+ base stock, at a yield greater than about 50%, or greater than about 75%, or greater than about 80%.

Embodiment 54. The method of embodiment 34, wherein separating the multi-ring naphthenes from the hydrocarbon feedstock is performed at a temperature from about 20° C. to about 300° C., and at a pressure from about 600 psi to about 1500 psi.

Embodiment 55. The method of embodiment 34, wherein separating the multi-ring naphthenes from the hydrocarbon feedstock is performed at a temperature from about 50° C. to about 225° C., and at a pressure from about 600 psi to about 1000 psi.

Embodiment 56. The method of embodiment 34, further comprising desorbing the metal-organic framework adsorbent to regenerate the metal-organic framework adsorbent.

Embodiment 57. The method of embodiment 34, further comprising desorbing the metal-organic framework adsorbent by contacting with a desorbing solvent.

Embodiment 58. The method of embodiment 57, wherein the desorbing solvent is a paraffinic solvent, an isoparaffinic solvent or a naphthenic solvent.

Embodiment 59. The method of embodiment 56, wherein desorbing the metal-organic framework adsorbent is conducted at a temperature from about 20° C. to about 300° C., and a pressure from about 600 psi to about 1500 psi.

Embodiment 60. The method of embodiment 56, wherein desorbing the metal-organic framework adsorbent is conducted at a temperature from about 50° C. to about 225° C., and a pressure from about 600 psi to about 1000 psi.

Embodiment 61. The method of embodiment 34, further comprising multiple adsorbent beds having the same or different adsorbent materials.

Embodiment 62. A method of upgrading a Group III base stock to a Group III+ base stock, wherein the Group III base stock comprises at least normal paraffins, isoparaffins, 1-ring naphthenes attached with a paraffinic alkyl chain, and multi-ring naphthenes, said method comprising passing the Group III base stock and a solvent, at a temperature and pressure through a bed of an adsorbent comprising a metal-organic framework (MOF) adsorbent, to adsorb the multi-ring naphthenes from the Group III base stock, thereby producing the Group III+ base stock that is depleted in multi-ring naphthenes; wherein the metal-organic framework adsorbent is a porous crystalline material comprised of metal functionalities connected by organic linkers to form a repeating 2-D or 3-D lattice.

Embodiment 63. The method of embodiment 62, wherein the Group III base stock has a viscosity index of greater than or equal to 120.

Embodiment 64. The method of embodiment 62, wherein the Group III+ base stock has a viscosity index of greater than or equal to 120.

Embodiment 65. The method of embodiment 62, wherein the difference between the Group III+ base stock viscosity index and the Group III viscosity index is equal to or greater than 5, as measured by ASTM D 2270-74.

Embodiment 66. The method of embodiment 62, wherein the multi-ring naphthenes are selected from the group consisting of 2-ring naphthenes, 3-ring naphthenes, 4-ring naphthenes, 5-ring naphthenes, and 5-ring+ naphthenes.

Embodiment 67. The method of embodiment 62, wherein the metal-organic framework adsorbent is a porous crystalline material comprised of metals or metal clusters linked by organic ligands that have a pore volume, as measured by nitrogen adsorption at 77K, of at least 0.5 cc/g.

Embodiment 68. The method of embodiment 62, wherein the metal-organic framework adsorbent has a metal-organic framework having a plurality of tetravalent metal cations or clusters of tetravalent metal cations linked by carboxylate-bearing linkers.

Embodiment 69. The method of embodiment 62, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

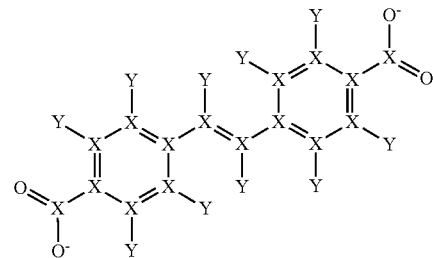

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

Embodiment 70. The method of embodiment 62, wherein the metal-organic framework adsorbent has a mean crystal particle size less than about 5 microns, or less than about 3 microns, or less than about 2 microns.

Embodiment 71. The method of embodiment 62, wherein the metal-organic framework adsorbent has a mean crystal particle size within the range of from about 0.01 microns to about 5 microns, or from about 0.01 microns to about 3 microns, or from about 0.05 microns to about 2 microns.

Embodiment 72. The method of embodiment 62, wherein the Group III+ base stock has a kinematic viscosity at 100° C. (KV100) from about 4.0 cSt to about 7.0 cSt, or from about 4.0 cSt to about 6.0 cSt, measured according to ASTM standard D-445.

Embodiment 73. The method of embodiment 62, wherein the Group III+ base stock has a kinematic viscosity at 40° C. (KV40) from about 15 cSt to about 42 cSt, or from about 18 cSt to about 40 cSt, measured according to ASTM standard D-445.

Embodiment 74. The method of embodiment 62, wherein the Group III+ base stock has a viscosity index from greater than or equal to 120 to about 150, or from about 130 to about 150, measured according to ASTM standard D-2270.

Embodiment 75. The method of embodiment 62, further comprising recovering the solvent to produce a recovered solvent.

Embodiment 76. The method of embodiment 62, further comprising contacting one or more nanofiltration membranes with the Group III+ base stock to recover the solvent from the Group III+ base stock.

Embodiment 77. The method of embodiment 62, further comprising contacting one or more distillation columns with the Group III+ base stock for stripping the solvent from the Group III+ base stock.

Embodiment 78. The method of embodiment 75, wherein the metal-organic framework adsorbent is contacted with the recovered solvent.

Embodiment 79. The method of embodiment 62, wherein the solvent is selected from the group consisting of pentane, iso-pentane, hexane, iso-hexane, heptane, iso-heptane, octane, iso-octane, cyclohexane, methyl cyclohexane, and mixtures thereof.

Embodiment 80. The method of embodiment 62, wherein the Group III base stock is converted to the Group III+ base stock, at a yield greater than about 50%, or greater than about 75%, or greater than about 80%.

Embodiment 81. The method of embodiment 62, wherein separating the multi-ring naphthenes from the hydrocarbon feedstock is performed at a temperature from about 20° C. to about 300° C., and at a pressure from about 600 psi to about 1500 psi.

Embodiment 82. The method of embodiment 62, wherein separating the multi-ring naphthenes from the hydrocarbon feedstock is performed at a temperature from about 50° C. to about 225° C., and at a pressure from about 600 psi to about 1000 psi.

Embodiment 83. The method of embodiment 62, further comprising desorbing the metal-organic framework adsorbent to regenerate the metal-organic framework adsorbent.

Embodiment 84. The method of embodiment 62, further comprising desorbing the metal-organic framework adsorbent by contacting with a desorbing solvent.

Embodiment 85. The method of embodiment 84, wherein the desorbing solvent is a paraffinic solvent, an isoparaffinic solvent or a naphthenic solvent.

Embodiment 86. The method of embodiment 83, wherein desorbing the metal-organic framework adsorbent is conducted at a temperature from about 20° C. to about 300° C., and a pressure from about 600 psi to about 1500 psi.

Embodiment 87. The method of embodiment 83, wherein desorbing the metal-organic framework adsorbent is conducted at a temperature from about 50° C. to about 225° C., and a pressure from about 600 psi to about 1000 psi.

Embodiment 88. The method of embodiment 62, further comprising multiple adsorbent beds having the same or different adsorbent materials.

Embodiment 89. A system for making a high quality base stock product, said system comprising: an adsorption bed comprising a metal-organic framework (MOF) adsorbent, wherein the metal-organic framework adsorbent is a porous crystalline material comprised of metal functionalities connected by organic linkers to form a repeating 2-D or 3-D lattice; a source of at least one hydrocarbon feedstock fluidically connected to the metal-organic framework adsorbent, wherein the hydrocarbon feedstock comprises at least normal paraffins, isoparaffins, 1-ring naphthenes attached with a paraffinic alkyl chain, and multi-ring naphthenes; a source of one or more solvents fluidically connected to the metal-organic framework adsorbent; a solvent recovery system in fluidic communication with the metal-organic framework adsorbent; wherein the metal-organic framework adsorbent is contacted with the hydrocarbon feedstock and the solvent, at a temperature and pressure, to adsorb the multi-ring naphthenes from the hydrocarbon feedstock, thereby producing a base stock product that is depleted in multi-ring naphthenes; and wherein the base stock product has a viscosity index (VI) greater than the viscosity index of the hydrocarbon feedstock.

Embodiment 90. The system of embodiment 89, wherein the metal-organic framework adsorbent is a porous crystalline material comprised of metals or metal clusters linked by organic ligands that have a pore volume, as measured by nitrogen adsorption at 77K, of at least 0.5 cc/g.

Embodiment 91. The system of embodiment 89, wherein the metal-organic framework adsorbent has a metal-organic framework having a plurality of tetravalent metal cations or clusters of tetravalent metal cations linked by carboxylate-bearing linkers.

Embodiment 92. The system of embodiment 89, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

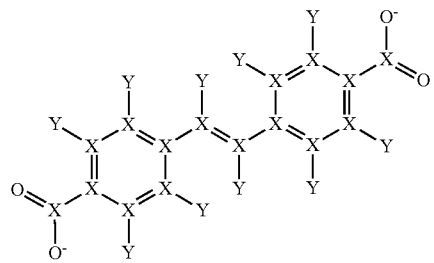

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

Embodiment 93. The system of embodiment 89, wherein the metal-organic framework adsorbent has a mean crystal particle size less than about 5 microns, or less than about 3 microns, or less than about 2 microns.

Embodiment 94. The system of embodiment 89, wherein the metal-organic framework adsorbent has a mean crystal particle size within the range of from about 0.01 microns to about 5 microns, or from about 0.01 microns to about 3 microns, or from about 0.05 microns to about 2 microns.

Embodiment 95. The system of embodiment 89, wherein the solvent recovery system comprises one or more nanofiltration membranes to recover the solvent from the base stock product.

Embodiment 96. The system of embodiment 89, wherein the solvent recovery system comprises one or more distillation columns for stripping the solvent from the base stock product.

Embodiment 97. The system of embodiment 89, wherein the hydrocarbon feedstock has a viscosity index less than 120.

Embodiment 98. The system of embodiment 89, wherein the base stock product has a viscosity index of greater than or equal to 120.

Embodiment 99. The system of embodiment 89, wherein the difference between the base stock product viscosity index and the hydrocarbon feedstock viscosity index is equal to or greater than 5, as measured by ASTM D 2270-74.

Embodiment 100. The system of embodiment 89, wherein the hydrocarbon feedstock comprises a feed base stock selected from the group consisting of a Group II base stock and a Group III base stock.

Embodiment 101. The system of embodiment 89, wherein the base stock product is selected from the group consisting of a Group II base stock, a Group II+ base stock, a Group III base stock, and a Group III+ base stock.

Embodiment 102. The system of embodiment 89, wherein the hydrocarbon feedstock is a Group II base stock, and the base stock product is a Group II+ base stock, a Group III base stock, or a Group III+ base stock.

Embodiment 103. The system of embodiment 89, wherein the hydrocarbon feedstock is a Group III base stock, and the base stock product is a Group III+ base stock.

Embodiment 104. The system of embodiment 89, wherein the multi-ring naphthenes are selected from the group consisting of 2-ring naphthenes, 3-ring naphthenes, 4-ring naphthenes, 5-ring naphthenes, and 5-ring+ naphthenes.

Embodiment 105. The system of embodiment 89, wherein the base stock product has a kinematic viscosity at 100° C. (KV100) from about 4.0 cSt to about 7.0 cSt, or from about 4.0 cSt to about 6.0 cSt, measured according to ASTM standard D-445.

Embodiment 106. The system of embodiment 89, wherein the base stock product has a kinematic viscosity at 40° C. (KV40) from about 15 cSt to about 42 cSt, or from about 18 cSt to about 40 cSt, measured according to ASTM standard D-445.

Embodiment 107. The system of embodiment 89, wherein the hydrocarbon feedstock has a viscosity index from greater than or equal to 80 to less than 120, or from about 90 to less than 120, measured according to ASTM standard D-2270.

Embodiment 108. The system of embodiment 89, wherein the base stock product has a viscosity index from greater than or equal to 120 to about 150, or from about 130 to about 150, measured according to ASTM standard D-2270.

Embodiment 109. The system of embodiment 89, wherein the solvent is recovered to produce a recovered solvent.

Embodiment 110. The system of embodiment 109, wherein the metal-organic framework adsorbent is contacted with the recovered solvent.

Embodiment 111. The system of embodiment 89, wherein the solvent is selected from the group consisting of pentane, iso-pentane, hexane, iso-hexane, heptane, iso-heptane, octane, iso-octane, cyclohexane, methyl cyclohexane, and mixtures thereof.

Embodiment 112. The system of embodiment 89, wherein a Group II base stock is converted to a Group II+ base stock, a Group III base stock, or a Group III+ base stock, at a yield greater than about 50%, or greater than about 75%, or greater than about 80%.

Embodiment 113. The system of embodiment 89, wherein a Group III base stock is converted to a Group III+ base stock, at a yield greater than about 50%, or greater than about 75%, or greater than about 80%.

Embodiment 114. The system of embodiment 89, wherein the multi-ring naphthenes are separated at a temperature from about 20° C. to about 300° C., and at a pressure from about 600 psi to about 1500 psi.

Embodiment 115. The system of embodiment 89, wherein the multi-ring naphthenes are separated at a temperature from about 50° C. to about 225° C., and at a pressure from about 600 psi to about 1000 psi.

Embodiment 116. The system of embodiment 89, wherein the metal-organic framework adsorbent is desorbed to regenerate the metal-organic framework adsorbent.

Embodiment 117. The system of embodiment 89, the metal-organic framework adsorbent is desorbed by contacting with a desorbing solvent.

Embodiment 118. The system of embodiment 117, wherein the desorbing solvent is a paraffinic solvent, an isoparaffinic solvent or a naphthenic solvent.

Embodiment 119. The system of embodiment 89, wherein the metal-organic framework adsorbent is desorbed at a temperature from about 20° C. to about 300° C., and a pressure from about 600 psi to about 1500 psi.

Embodiment 120. The system of embodiment 89, wherein the metal-organic framework adsorbent is desorbed at a temperature from about 50° C. to about 225° C., and a pressure from about 600 psi to about 1000 psi.

Embodiment 121. The system of embodiment 89, further comprising multiple adsorbent beds having the same or different adsorbent materials.

Embodiment 122. A method of upgrading a Group II+ base stock to a Group III or Group III+ base stock, wherein the Group II+ base stock comprises at least normal paraffins, isoparaffins, 1-ring naphthenes attached with a paraffinic alkyl chain, and multi-ring naphthenes, said method comprising passing the Group II+ base stock and a solvent, at a temperature and pressure through a bed of an adsorbent comprising a metal-organic framework (MOF) adsorbent, to adsorb the multi-ring naphthenes from the Group II+ base stock, thereby producing the Group III or Group III+ base stock that is depleted in multi-ring naphthenes; wherein the metal-organic framework adsorbent is a porous crystalline material comprised of metal functionalities connected by organic linkers to form a repeating 2-D or 3-D lattice.

Embodiment 123. The method of embodiment 122, wherein the Group II+ base stock has a viscosity index less than 120.

Embodiment 124. The method of embodiment 122, wherein the Group III or Group III+ base stock has a viscosity index of greater than or equal to 120.

Embodiment 125. The method of embodiment 122, wherein the difference between the Group III or Group III+ base stock viscosity index and the Group II+ viscosity index is equal to or greater than 5, as measured by ASTM D 2270-74.

Embodiment 126. The method of embodiment 122, wherein the multi-ring naphthenes are selected from the group consisting of 2-ring naphthenes, 3-ring naphthenes, 4-ring naphthenes, 5-ring naphthenes, and 5-ring+ naphthenes.

Embodiment 127. The method of embodiment 122, wherein the metal-organic framework adsorbent is a porous crystalline material comprised of metals or metal clusters linked by organic ligands that have a pore volume, as measured by nitrogen adsorption at 77K, of at least 0.5 cc/g.

Embodiment 128. The method of embodiment 122, wherein the metal-organic framework adsorbent has a metal-organic framework having a plurality of tetravalent metal cations or clusters of tetravalent metal cations linked by carboxylate-bearing linkers.

Embodiment 129. The method of embodiment 122, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

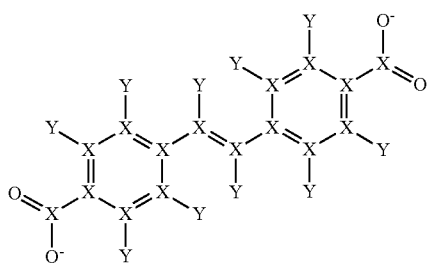

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

Embodiment 130. The method of embodiment 122, wherein the metal-organic framework adsorbent has a mean crystal particle size less than about 5 microns, or less than about 3 microns, or less than about 2 microns.

Embodiment 131. The method of embodiment 122, wherein the metal-organic framework adsorbent has a mean crystal particle size within the range of from about 0.01 microns to about 5 microns, or from about 0.01 microns to about 3 microns, or from about 0.05 microns to about 2 microns.

Embodiment 132. The method of embodiment 122, wherein the Group III or Group III+ base stock has a kinematic viscosity at 100° C. (KV100) from about 4.0 cSt to about 7.0 cSt, or from about 4.0 cSt to about 6.0 cSt, measured according to ASTM standard D-445.

Embodiment 133. The method of embodiment 122, wherein the Group III or Group III+ base stock has a kinematic viscosity at 40° C. (KV40) from about 15 cSt to about 42 cSt, or from about 18 cSt to about 40 cSt, measured according to ASTM standard D-445.

Embodiment 134. The method of embodiment 122, wherein the Group III or Group III+ base stock has a viscosity index from greater than or equal to 120 to about 150, or from about 130 to about 150, measured according to ASTM standard D-2270.

Embodiment 135. The method of embodiment 122, further comprising recovering the solvent to produce a recovered solvent.

Embodiment 136. The method of embodiment 122, further comprising contacting one or more nanofiltration membranes with the Group III or Group III+ base stock to recover the solvent from the Group III or Group III+ base stock.

Embodiment 137. The method of embodiment 122, further comprising contacting one or more distillation columns with the Group III or Group III+ base stock for stripping the solvent from the Group III or Group III+ base stock.

Embodiment 138. The method of embodiment 135, wherein the metal-organic framework adsorbent is contacted with the recovered solvent.

Embodiment 139. The method of embodiment 122, wherein the solvent is selected from the group consisting of pentane, iso-pentane, hexane, iso-hexane, heptane, iso-heptane, octane, iso-octane, cyclohexane, methyl cyclohexane, and mixtures thereof.

Embodiment 140. The method of embodiment 122, wherein the Group II+ base stock is converted to the Group III or Group III+ base stock, at a yield greater than about 50%, or greater than about 75%, or greater than about 80%.

Embodiment 141. The method of embodiment 122, wherein separating the multi-ring naphthenes from the hydrocarbon feedstock is performed at a temperature from about 20° C. to about 300° C., and at a pressure from about 600 psi to about 1500 psi.

Embodiment 142. The method of embodiment 122, wherein separating the multi-ring naphthenes from the hydrocarbon feedstock is performed at a temperature from about 50° C. to about 225° C., and at a pressure from about 600 psi to about 1000 psi.

Embodiment 143. The method of embodiment 122, further comprising desorbing the metal-organic framework adsorbent to regenerate the metal-organic framework adsorbent.

Embodiment 144. The method of embodiment 122, further comprising desorbing the metal-organic framework adsorbent by contacting with a desorbing solvent.

Embodiment 145. The method of embodiment 144, wherein the desorbing solvent is a paraffinic solvent, an isoparaffinic solvent or a naphthenic solvent.

Embodiment 146. The method of embodiment 143, wherein desorbing the metal-organic framework adsorbent is conducted at a temperature from about 20° C. to about 300° C., and a pressure from about 600 psi to about 1500 psi.

Embodiment 147. The method of embodiment 143, wherein desorbing the metal-organic framework adsorbent is conducted at a temperature from about 50° C. to about 225° C., and a pressure from about 600 psi to about 1000 psi.

Embodiment 148. The method of embodiment 122, further comprising multiple adsorbent beds having the same or different adsorbent materials.

Embodiment 149. The method of embodiment 1 wherein the feedstock and base stock product have a multi-ring naphthene weight ratio (feedstock:base stock product) ranging from about 1.1:1 to about 10:0.01.

Embodiment 150. The method of embodiment 34 wherein the feedstock and base stock product have a multi-ring naphthene weight ratio (feedstock:base stock product) ranging from about 1.1:1 to about 10:0.01.

Embodiment 151. The method of embodiment 62 wherein the feedstock and base stock product have a multi-ring naphthene weight ratio (feedstock:base stock product) ranging from about 1.1:1 to about 10:0.01.

Embodiment 152. The method of embodiment 122 wherein the feedstock and base stock product have a multi-ring naphthene weight ratio (feedstock:base stock product) ranging from about 1.1:1 to about 10:0.01.

Embodiment 153. The system of embodiment 89 wherein the feedstock and base stock product have a multi-ring naphthene weight ratio (feedstock:base stock product) ranging from about 1.1:1 to about 10:0.01.

Embodiment 154. The method of embodiments 1, 34, 62, 89 and 122, further comprising desorbing the metal-organic framework (MOF) adsorbent to produce a concentrated multi-ring naphthene stream for use as a naphthenic rich feedstock.

Additional features of the present methodologies are described in the following non-limiting examples.

EXAMPLES

A metal-organic framework (zirconium based, 4,4'-stilbenedicarboxylic acid as organic linker) adsorbent was used for the separations herein. The metal-organic framework adsorbent is a porous crystalline material comprised of metal functionalities connected by organic linkers to form a repeating 2-D or 3-D lattice. A packed bed of the adsorbent exhibited inverse shape selectivity with higher affinity for multi-ring naphthenes over linear- and branched paraffins. Use of commercially available Group III base stock as a feed demonstrated feasibility of upgrading Group III to higher viscosity index base stock at high yield (>80%). Selectivity of multi-ring naphthenes was maintained over a range of temperature, which gives flexibility for process integration. The metal-organic framework adsorbent offers higher pore volume, thus higher adsorption capacity for a given size of a column as compared to zeolite. These features result in multiple advantages for process design such as more effective use of bed capacity as it targets to adsorb relatively lower concentration of the components from the mixture, allowing use of smaller size of adsorption beds and less solvent consumption to achieve a targeted production volume of higher grade lube base stock.

FIG. 1 is a flow diagram of adsorptive separation process to produce lube base stock with enhanced viscosity index. The down arrow indicates higher affinity of low viscosity index molecules (i.e., multi-ring naphthenes) to the adsorbent. The paraffinic stream includes enriched normal paraffins (nP), isoparaffins (iP) and 1-ring naphthenes attached with paraffinic alkyl chains.

FIG. 1 illustrates a separation process of this disclosure to produce enhanced viscosity index base stock with high yield by using naphthene selective adsorbents. FIG. 2 shows a process scheme where Group III base stock is fed to the adsorption bed as an example. This disclosure includes use of the unique selectivity behavior of metal-organic framework adsorbents to produce improved quality of base stock at high yield by removing lower concentrations of multi-ring naphthenes (i.e., unfavorable molecules for viscosity index) from complex hydrocarbon mixtures through adsorptive separation process.

A liquid chromatographic system was used to study adsorption at elevated temperature. The metal-organic framework adsorbents were dry-packed into 4.6 mm ID×100 or 250 mm long stainless steel columns with 0.5 micron frits at each end. The adsorbents were dried at 150° C. for 2 hour in a flow of dry nitrogen. A packed column was equilibrated at a given temperature with a solvent (i.e., desorbent) prior to feed injection. 2,2,4-trimethyl pentane (isooctane) and n-hexane were used as desorbents. The synthetic mixture solution was prepared by using standard compounds, including octadecane (nC28), squalane (iC30), cholestane (C27, 4RN), pristane (iC19), and octadecyl cyclohexane (C24, 1RN). The mixture was introduced to a packed column through loop injection. The flow rate of solvent was set at 0.4 ml/min. Effluent from the column was collected in the fraction collector and concentrations of each component in the fractions were analyzed by GC-FID. Commercially available base stocks including Group III and Group II+ were also used as a feed for separation.

Figure 3:
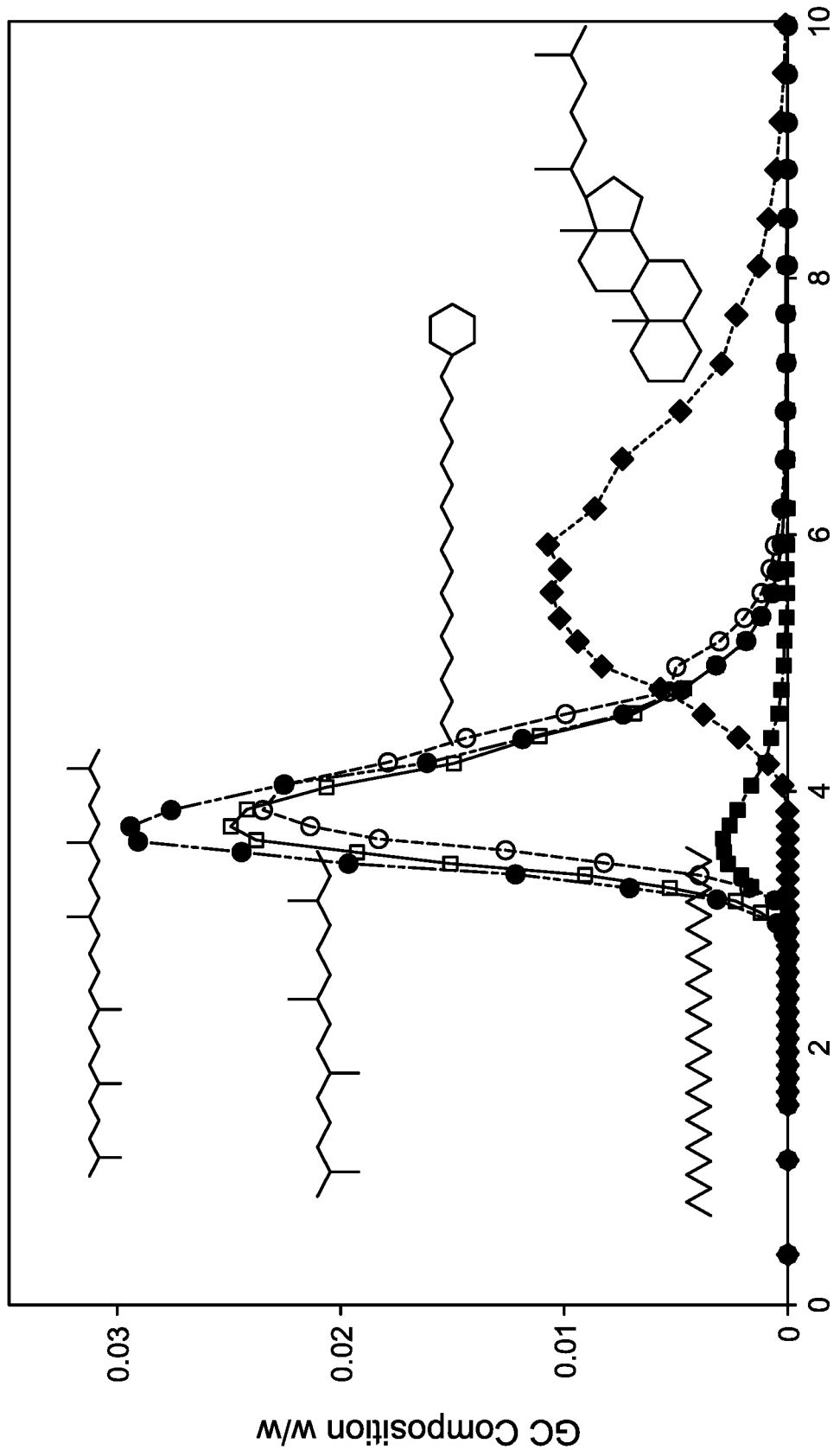
FIG. 3 graphically shows the separation of lube range model compounds using a metal-organic framework adsorbent packed bed, in accordance with the Examples.

FIG. 3 graphically depicts separation of lube range model compounds by the metal-organic framework adsorbent in a packed bed. The pulse HPLC run was at 100° C. and n-heptane was used as desorbent. FIG. 3 demonstrates higher affinity of the metal-organic framework adsorbent toward multi-ring naphthenes (i.e., cholestane, C27) compared to the rest of paraffinic molecules (nC28, iC19, iC30) from the synthetic mixture. This competitive adsorption of the bulkier multi-ring naphthenic molecule reveals unique selectivity behavior of the metal-organic framework adsorbent as compared to traditional microporous adsorbents, which typically exclude bulkier molecules and adsorb linear or branched molecules more strongly.

Cholestane has lower carbon numbers than most of the paraffinic molecules in the mixture, and this indicates that the shape of a molecule is what drives stronger adsorption of molecules instead of the size of the molecules. This shows that the metal-organic framework adsorbent can selectively separate multi-ring based molecules from a complex mixture such as lube base stocks that contain molecules with a wide range of carbon numbers (e.g., C18 to C40) and diverse hydrocarbon classes. Although the metal-organic framework adsorbent exhibited slight adsorption for octadecyl cyclohexane (i.e., 1-ring naphthene), strong adsorption of multi-ring naphthenes makes it suitable for lube upgrade where multi-ring naphthenes in base stocks negatively impact viscosity index. For example, a molecule of 4-ring naphthene with linear octyl chain attached gives negative viscosity index number. The low affinity towards 1-ring naphthene molecules is advantageous as these molecules can typically have higher viscosity index, and not removing them by adsorption gives rise to higher yield.

Figure 4:
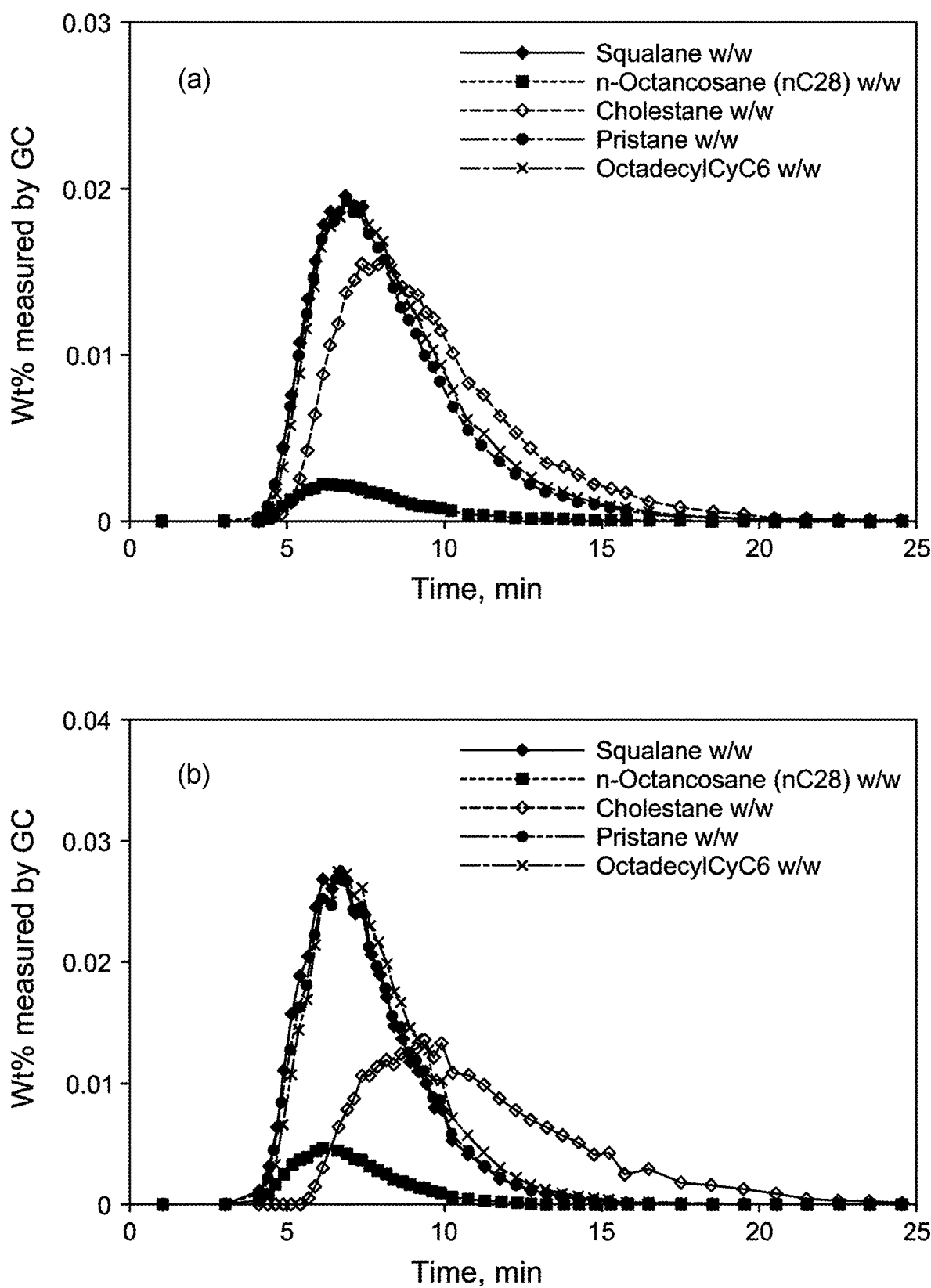
FIG. 4 graphically shows the effect of desorbent for separation of a lube model mixture on a metal-organic framework adsorbent packed column through pulse high pressure liquid chromatography (HPLC), in accordance with the Examples.

FIG. 4 graphically depicts the effect of desorbent for separation of the lube model mixture on the metal-organic framework adsorbent packed column through pulse HPLC experiments; (a) isooctane, (b) n-hexane as desorbent at 150° C. FIG. 4 compares the effect of different desorbent on separation. Linear paraffinic desorbent (nC6) is weakly competing solvent compared to isoparaffinic solvent (iC8), thus it results in improved separation of naphthenic compounds. This shows that by adjusting solvent affinity the exact separation of multi-ring naphthene molecules can be tuned to any threshold required (5-ring+, 4-ring+, 3-ring+, etc.) by separation.

Figure 5:
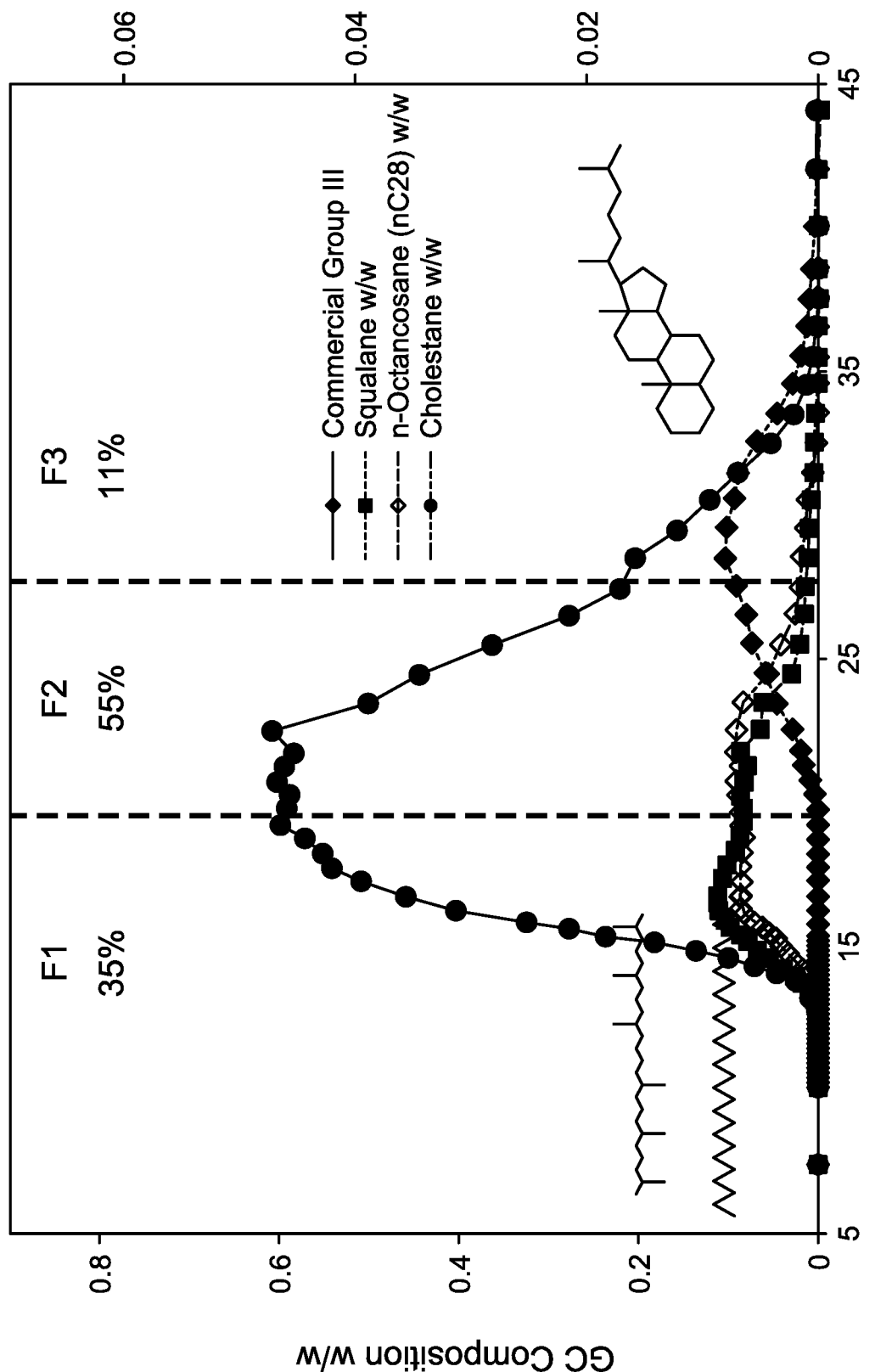
FIG. 5 graphically shows a Group III base stock separation profile using a metal-organic framework adsorbent, in accordance with the Examples.

FIG. 5 graphically depicts a Group III base stock separation profile by using the metal-organic framework adsorbent. The base stock solution (10 wt % of the base stock in n-heptane) was spiked with a model mixture including squalane (0.5 wt %), n-octacosane (0.5 wt %), cholestane (0.5 wt %), n-heptane was used as desorbent, and the operation temperature was 100° C. Vertical dashed lines are three cut points of the separated fractions for detailed compositional analysis. The left y axis is for the base stock response, and the right y axis is for the responses for three model compounds. FIG. 5 illustrates how the three fraction cut points were collected for the yield of each fraction using commercially available Group III base stock as a feed. The model compound mix was spiked in commercially available Group III to confirm naphthene separation from a complex mixture.

Figure 6:
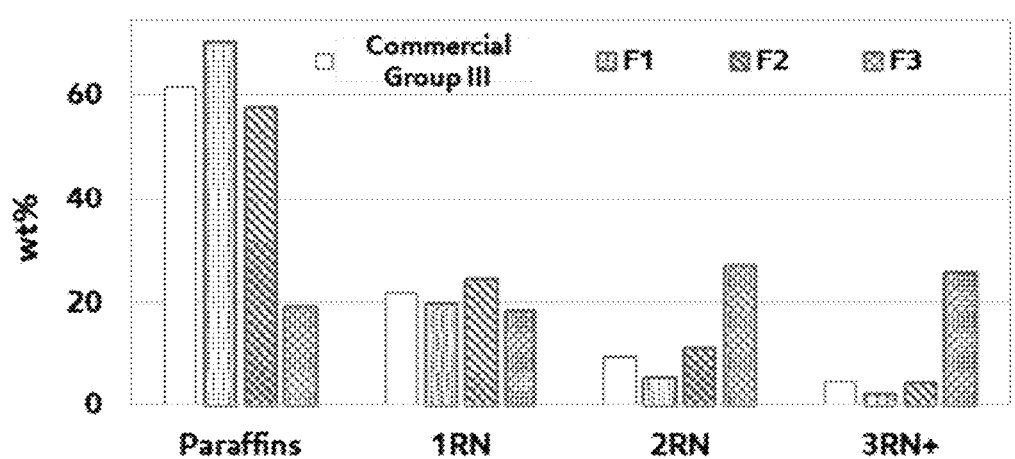
FIG. 6 graphically shows the compositional analysis of the separated fractions from FIG. 5 by two-dimensional gas chromatography (2DGC), in accordance with the Examples.

FIG. 6 graphically depicts the compositional analysis of the separated fractions from FIG. 5 by 2DGC analysis. All three fractions are composed of different concentrations of hydrocarbon classes, indicating molecules were separated across the pulse and product composition varied depending on the yield. As compared to the feed, the first fraction (35% yield) exhibited much enriched paraffinic (linear/branched) composition with reduced multi-ring naphthenes, whereas the last fraction, i.e., the 11% cut at the tail, showed substantial enrichment of multi-naphthenic rings (i.e., 2RN and 3RN+). This aligns with what is expected based on the model mixture study where weakly adsorbing paraffinic molecules elute early, followed by elution of strongly adsorbed naphthenic molecules. It also demonstrates that multi-ring naphthenes can be selectively separated from a complex mix of lube base stock.

Adsorptive separation using the metal-organic framework adsorbent allows removal of those lower concentration of multi-ring naphthenes from a base stock, which results in improved quality of base stock and also offers flexibility to tune composition distribution based on a yield needed for higher quality of lube base stock. FIG. 5 also shows that separation can be done at very high loading (high concentration of base stock), thereby decreasing the size of adsorbent bed for separation application.

FIG. 7 shows a comparison of separated products at various yields from Group III base stock. FIG. 7 summarizes the impact of the multi-ring separation on properties of base stocks. It compares viscosity index and viscosity of products at different yields with those of the feed. The products at various yields were obtained by collecting the front fraction of the pulse (i.e., more paraffinic) from the metal-organic framework adsorbent bed. At all cases, the product quality is improved in terms of viscosity index and kinetic viscosity values. It is feasible to obtain Group III+ quality of viscosity index (130+) at higher than 80% yield, and higher viscosity index stream can be produced upon adjusting yields. Since paraffins are concentrated at the front of the pulse, increase of the yield would cause inclusion of more naphthenic molecules in the product, thus lower viscosity index and higher viscosity. However, even at 90% yield, the separated product shows viscosity index and kinetic viscosity improvement, again demonstrating removal of low concentration of multi-ring naphthenes for viscosity index and kinetic viscosity improvement.

FIG. 8 shows tabular data resulting from a comparison of separated products at different yields from a commercially available Group II+ feedstock for viscosity index enhancement. FIG. 8 is an example for viscosity index enhancement of Group II+ as feed, demonstrating feasibility of using various composition of base stock as feed for separation, to make Group III base stock at high yield.

PCT and EP Clauses:

1. A method for separating multi-ring naphthenes from a hydrocarbon feedstock, wherein the hydrocarbon feedstock comprises at least normal paraffins, isoparaffins, 1-ring naphthenes attached with a paraffinic alkyl chain, and multi-ring naphthenes, said method comprising passing the hydrocarbon feedstock and a solvent, at a temperature and pressure through a bed of an adsorbent comprising a metal-organic framework (MOF) adsorbent, to adsorb the multi-ring naphthenes from the hydrocarbon feedstock, thereby producing a base stock product that is depleted in multi-ring naphthenes; wherein the metal-organic framework adsorbent is a porous crystalline material comprised of metal functionalities connected by organic linkers to form a repeating 2-D or 3-D lattice; and wherein the base stock product has a viscosity index (VI) greater than the viscosity index of the hydrocarbon feedstock.

2. The method of clause 1, wherein the hydrocarbon feedstock has a viscosity index less than 120, and the base stock product has a viscosity index of greater than or equal to 120.

3. The method of clause 1, wherein the difference between the base stock product viscosity index and the hydrocarbon feedstock viscosity index is equal to or greater than 5, as measured by ASTM D 2270-74.

4. The method of clause 1, wherein the hydrocarbon feedstock is a Group II base stock, and the base stock product is a Group II+ base stock, a Group III base stock, or a Group III+ base stock; or wherein the hydrocarbon feedstock is a Group II+ base stock, and the base stock product is a Group III base stock, or a Group III+ base stock; or wherein the hydrocarbon feedstock is a Group III base stock, and the base stock product is a Group III+ base stock.

5. The method of clause 1, wherein the multi-ring naphthenes are selected from the group consisting of 2-ring naphthenes, 3-ring naphthenes, 4-ring naphthenes, 5-ring naphthenes, and 5-ring+ naphthenes.

6. The method of clause 1, wherein the solvent is selected from the group consisting of pentane, iso-pentane, hexane, iso-hexane, heptane, iso-heptane, octane, iso-octane, cyclohexane, methyl cyclohexane, and mixtures thereof.

7. The method of clause 1, wherein the metal-organic framework adsorbent is a porous crystalline material comprised of metals or metal clusters linked by organic ligands that have a pore volume, as measured by nitrogen adsorption at 77K, of at least 0.5 cc/g.

8. The method of clause 1, wherein the metal-organic framework adsorbent has a plurality of tetravalent metal cations or clusters of tetravalent metal cations linked by carboxylate-bearing linkers.

9. The method of clause 1, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

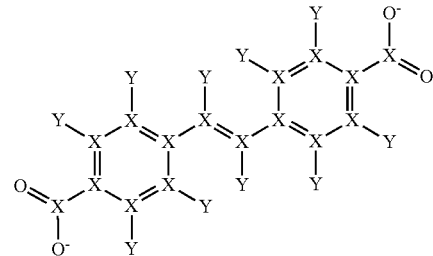

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

10. The method of clause 1, wherein the metal-organic framework adsorbent has a mean crystal particle size within the range of from about 0.01 microns to about 5 microns, or from about 0.01 microns to about 3 microns, or from about 0.05 microns to about 2 microns.

11. The method of clause 1, wherein separating the multi-ring naphthenes from the hydrocarbon feedstock is performed at a temperature from about 20° C. to about 300° C., or from about 50° C. to about 225° C., and at a pressure from about 600 psi to about 1500 psi, or from about 600 psi to about 1000 psi.

12. The method of clause 1, wherein a Group II base stock is converted to a Group II+ base stock, a Group III base stock, or a Group III+ base stock, at a yield greater than about 50%, or greater than about 75%, or greater than about 80%; or wherein a Group II+ base stock is converted to a Group III base stock, or a Group III+ base stock, at a yield greater than about 50%, or greater than about 75%, or greater than about 80%; or wherein a Group III base stock is converted to a Group III+ base stock, at a yield greater than about 30%, or greater than about 75%, or greater than about 80%.

13. The method of clause 1 wherein the feedstock and base stock product have a multi-ring naphthene weight ratio (feedstock:base stock product) ranging from about 1.1:1 to about 10:0.01.

14. The method of clause 1 which comprises upgrading a Group II base stock to a Group II+, Group III or Group III+ base stock, or upgrading a Group II+ base stock to Group III or Group III+ base stock, or upgrading a Group III base stock to a Group III+ base stock.

15. A system for making a high quality base stock, said system comprising: an adsorption bed comprising a metal-organic framework (MOF) adsorbent, wherein the metal-organic framework adsorbent is a porous crystalline material comprised of metal functionalities connected by organic linkers to form a repeating 2-D or 3-D lattice; a source of at least one hydrocarbon feedstock fluidically connected to the metal-organic framework adsorbent, wherein the hydrocarbon feedstock comprises at least normal paraffins, isoparaffins, 1-ring naphthenes attached with a paraffinic alkyl chain, and multi-ring naphthenes; a source of one or more solvents fluidically connected to the metal-organic framework adsorbent; a solvent recovery system in fluidic communication with the metal-organic framework adsorbent; wherein the metal-organic framework adsorbent is contacted with the hydrocarbon feedstock and the solvent, at a temperature and pressure, to adsorb the multi-ring naphthenes from the hydrocarbon feedstock, thereby producing a base stock product that is depleted in multi-ring naphthenes; and wherein the base stock product has a viscosity index (VI) greater than the viscosity index of the hydrocarbon feedstock.

All numerical values within the detailed description and the claims can modified by "about" or "approximately" the indicated value, taking into account experimental error and variations.

For the sake of brevity, only certain ranges are explicitly disclosed herein. However, ranges from any lower limit can be combined with any upper limit to recite a range not explicitly recited, as well as, ranges from any lower limit can be combined with any other lower limit to recite a range not explicitly recited, in the same way, ranges from any upper limit can be combined with any other upper limit to recite a range not explicitly recited.

Additionally, within a range includes every point or individual value between its end points even though not explicitly recited. Thus, every point or individual value can serve as its own lower or upper limit combined with any other point or individual value or any other lower or upper limit, to recite a range not explicitly recited.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

What is claimed is:

1. A method for separating multi-ring naphthenes from a hydrocarbon feedstock, wherein the hydrocarbon feedstock has a viscosity index greater than or equal to 80 measured according to ASTM standard D-2270 and comprises at least normal paraffins, isoparaffins, 1-ring naphthenes attached to a paraffinic alkyl chain, and multi-ring naphthenes, said method comprising:

passing a combined feed comprising the hydrocarbon feedstock and a solvent having a boiling point of less than 300° C., at a temperature and pressure through a bed of an adsorbent comprising a metal-organic framework adsorbent, to adsorb the multi-ring naphthenes from the hydrocarbon feedstock, thereby producing a base stock product that is depleted in multi-ring naphthenes, a weight ratio of the solvent to the hydrocarbon feedstock being from 1:1 to 50:1, and after passing the combined feed, desorbing at least a portion of the multi-ring naphthenes from the bed of metal-organic framework adsorbent to regenerate the bed of metal-organic framework adsorbent, wherein the metal-organic framework adsorbent is a porous crystalline material comprised of metal functionalities connected by organic linkers to form a repeating 2-D or 3-D lattice; and wherein the base stock product has a viscosity index greater than the viscosity index of the hydrocarbon feedstock.

2. The method of claim 1, wherein the hydrocarbon feedstock has a viscosity index less than 120, and the base stock product has a viscosity index of greater than or equal to 120.

3. The method of claim 1, wherein the difference between the base stock product viscosity index and the hydrocarbon feedstock viscosity index is equal to or greater than 5, as measured by ASTM D 2270-74.

4. The method of claim 1, wherein the hydrocarbon feedstock comprises a feed base stock selected from the group consisting of a Group II base stock, Group II+, and a Group III base stock, and the base stock product is selected from the group consisting of a Group II base stock, a Group II+ base stock, a Group III base stock, and a Group III+ base stock.

5. The method of claim 1, wherein the hydrocarbon feedstock is a Group II base stock, and the base stock product is a Group II+ base stock, a Group III base stock, or a Group III+ base stock.

6. The method of claim 1, wherein the hydrocarbon feedstock is a Group II+ base stock, and the base stock product is a Group III base stock, or a Group III+ base stock.

7. The method of claim 1, wherein the hydrocarbon feedstock is a Group III base stock, and the base stock product is a Group III+ base stock.

8. The method of claim 1, wherein the multi-ring naphthenes are selected from the group consisting of 2-ring naphthenes, 3-ring naphthenes, 4-ring naphthenes, 5-ring naphthenes, and 5-ring+ naphthenes.

9. The method of claim 1, wherein the solvent is selected from the group consisting of pentane, iso-pentane, hexane, iso-hexane, heptane, iso-heptane, octane, iso-octane, cyclohexane, methyl cyclohexane, and mixtures thereof.

10. The method of claim 1, wherein the metal-organic framework adsorbent is a porous crystalline material comprised of metals or metal clusters linked by organic ligands that have a pore volume, as measured by nitrogen adsorption at 77K, of at least 0.5 cc/g.

11. The method of claim 1, wherein the metal-organic framework adsorbent has a metal-organic framework having a plurality of tetravalent metal cations or clusters of tetravalent metal cations linked by carboxylate-bearing linkers.

12. The method of claim 1, wherein the metal-organic framework adsorbent comprises a plurality of tetravalent metal clusters, wherein the tetravalent metal clusters comprise at least one of zirconium, hafnium, titanium and cerium, and wherein the tetravalent metal clusters are connected through ligands of type L having the formula:

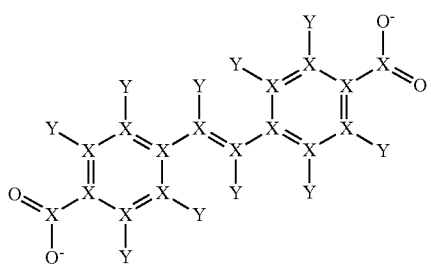

wherein X is independently carbon or nitrogen, and Y is independently hydrogen, an alkyl group, a halide group, an alcohol group, an ether group, an amine group, an amide group, a nitro group, a thiol group, a sulfonate group, a sulfonic acid group, an acyl group, an ester group, a carboxylate group, or a pair of electrons when X is a pyridinic nitrogen.

13. The method of claim 1, wherein the metal-organic framework adsorbent has a mean crystal particle size within the range of from about 0.01 microns to about 5 microns.

14. The method of claim 1, wherein the base stock product has a kinematic viscosity at 100° C. (KV100) from about 3.9 cSt to about 7.0 cSt measured according to ASTM standard D-445; or wherein the base stock product has a kinematic viscosity at 40° C. (KV40) from about 15 cSt to about 42 cSt measured according to ASTM standard D-445.

15. The method of claim 1, wherein the hydrocarbon feedstock has a viscosity index from greater than or equal to 80 to less than 120 measured according to ASTM standard D-2270.

16. The method of claim 1, wherein the base stock has a viscosity index from greater than or equal to 120 to about 150 measured according to ASTM standard D-2270.

17. The method of claim 1, wherein a Group II base stock is converted to a Group II+ base stock, a Group III base stock, or a Group III+ base stock, at a yield greater than about 50%; or wherein a Group II+ base stock is converted to a Group III base stock, or a Group III+ base stock, at a yield greater than about 50%; or wherein a Group III base stock is converted to a Group III+ base stock, at a yield greater than about 30%.

18. The method of claim 1, wherein separating the multi-ring naphthenes from the hydrocarbon feedstock is performed at a temperature from about 20° C. to about 300° C. and at a pressure from about 600 psi to about 1500 psi.

19. The method of claim 1, wherein desorbing from the bed of metal-organic framework adsorbent produces a concentrated multi-ring naphthene stream for use as a naphthenic rich feedstock.

20. The method of claim 1 wherein the feedstock and base stock product have a multi-ring naphthene weight ratio (feedstock: base stock product) ranging from about 1.1:1 to about 10:0.01.

21. The method of claim 1, wherein desorbing from the bed of metal-organic framework adsorbent comprises contacting the bed of metal-organic framework adsorbent with a desorbing solvent.

22. A method of upgrading a Group II base stock to a Group II+, Group III or Group III+ base stock, wherein the Group II base stock comprises at least normal paraffins, isoparaffins, 1-ring naphthenes attached to a paraffinic alkyl chain, and multi-ring naphthenes, said method comprising passing a combined feed comprising the Group II base stock and a solvent having a boiling point of less than 300° C., at a temperature and pressure through a bed of an adsorbent comprising a metal-organic framework adsorbent, to adsorb the multi-ring naphthenes from the Group II base stock, thereby producing a Group II+, Group III or Group III+ base stock that is depleted in multi-ring naphthenes, a weight ratio of the solvent to the Group II base stock being from 1:1 to 50:1, and after passing the combined feed, desorbing at least a portion of the multi-ring naphthenes from the metal-organic framework adsorbent to regenerate the metal-organic framework adsorbent, wherein the metal-organic framework adsorbent is a porous crystalline material comprised of metal functionalities connected by organic linkers to form a repeating 2-D or 3-D lattice.

23. A method of upgrading a Group II+ base stock to Group III or Group III+ base stock, wherein the Group II+ base stock comprises at least normal paraffins, isoparaffins, 1-ring naphthenes attached to a paraffinic alkyl chain, and multi-ring naphthenes, said method comprising passing a combined feed comprising the Group II+ base stock and a solvent having a boiling point of less than 300° C., at a temperature and pressure through a bed of an adsorbent comprising a metal-organic framework adsorbent, to adsorb the multi-ring naphthenes from the Group II+ base stock, thereby producing a Group III or Group III+ base stock that is depleted in multi-ring naphthenes, a weight ratio of the solvent to the Group II+ base stock being from 1:1 to 50:1, and after passing the combined feed, desorbing at least a portion of the multi-ring naphthenes from the metal-organic framework adsorbent to regenerate the metal-organic framework adsorbent, wherein the metal-organic framework adsorbent is a porous crystalline material comprised of metal functionalities connected by organic linkers to form a repeating 2-D or 3-D lattice.

24. A method of upgrading a Group III base stock to a Group III+ base stock, wherein the Group III base stock comprises at least normal paraffins, isoparaffins, 1-ring naphthenes attached to a paraffinic alkyl chain, and multi-ring naphthenes, said method comprising passing a combined feed comprising the Group III base stock and a solvent having a boiling point of less than 300° C., at a temperature and pressure through a bed of an adsorbent comprising a metal-organic framework adsorbent, to adsorb the multi-ring naphthenes from the Group III base stock, thereby producing the Group III+ base stock that is depleted in multi-ring naphthenes, a weight ratio of the solvent to the Group III base stock being from 1:1 to 50:1, and after passing the combined feed, desorbing at least a portion of the multi-ring naphthenes from the metal-organic framework adsorbent to regenerate the metal-organic framework adsorbent, wherein the metal-organic framework adsorbent is a porous crystalline material comprised of metal functionalities connected by organic linkers to form a repeating 2-D or 3-D lattice.

* * * * *